(12) United States Patent
Yoshida

(10) Patent No.: US 8,896,650 B1
(45) Date of Patent: Nov. 25, 2014

(54) SCANNING OPTICAL APPARATUS AND IMAGE FORMING APPARATUS

(71) Applicant: KYOCERA Document Solutions Inc., Osaka (JP)

(72) Inventor: Shingo Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/267,388

(22) Filed: May 1, 2014

(30) Foreign Application Priority Data

May 8, 2013 (JP) .................................. 2013-098389

(51) Int. Cl.
  *B41J 27/00* (2006.01)
  *B41J 2/435* (2006.01)
  *B41J 2/385* (2006.01)
  *G02B 26/12* (2006.01)
  *G03G 13/04* (2006.01)

(52) U.S. Cl.
  CPC .............. *G02B 26/127* (2013.01); *G03G 13/04* (2013.01)

USPC ........... 347/261; 347/257; 347/258; 347/259; 347/260; 347/224; 347/263; 347/246; 347/118

(58) Field of Classification Search
  USPC ................... 347/257–261, 263, 246, 118, 224
  See application file for complete search history.

(56) References Cited

FOREIGN PATENT DOCUMENTS

| JP | 05181076 A | * | 7/1993 |
|---|---|---|---|
| JP | H 05-181076 A | | 7/1993 |
| JP | 2001-066524 A | | 3/2001 |

* cited by examiner

*Primary Examiner* — Sarah Al Hashimi
(74) *Attorney, Agent, or Firm* — Stein IP, LLC

(57) ABSTRACT

The calculation unit calculates the time interval between the time at detecting the light beam reflected by the reflective surface of the rotatory polyhedron incident on the BD sensor by the light beam detecting unit and the time at detecting the light beam reflected by the reflective surface incident on the optical sensor in the light source by the return light beam detecting unit. The scan adjusting unit adjusts the luminescence time of the light source for scanning the light beam on the surface to be scanned based on the time interval calculated by the calculation unit.

8 Claims, 19 Drawing Sheets

FIG. 8A  INITIAL
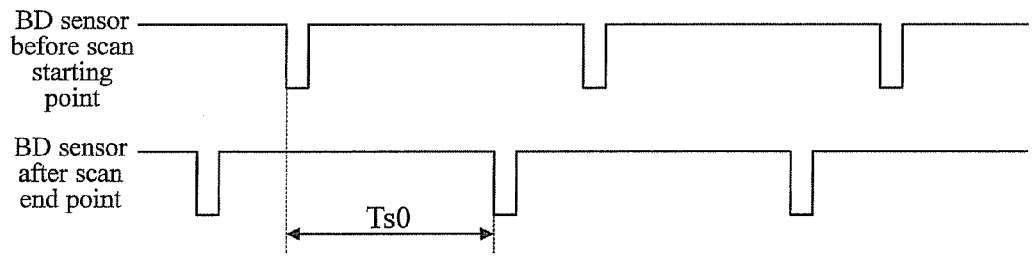
FIG. 8B  AFTER TEMPERATURE CHANGE
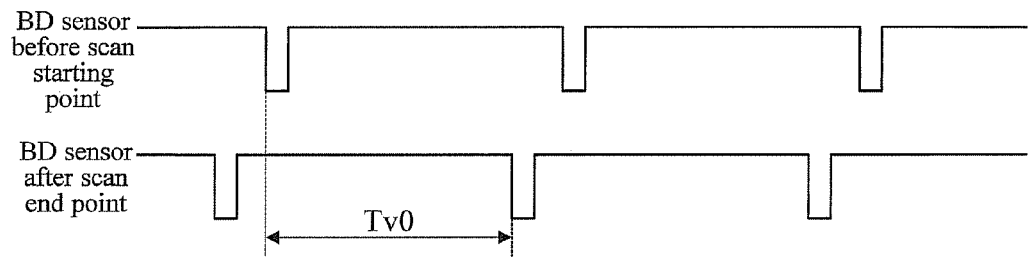
FIG. 8C
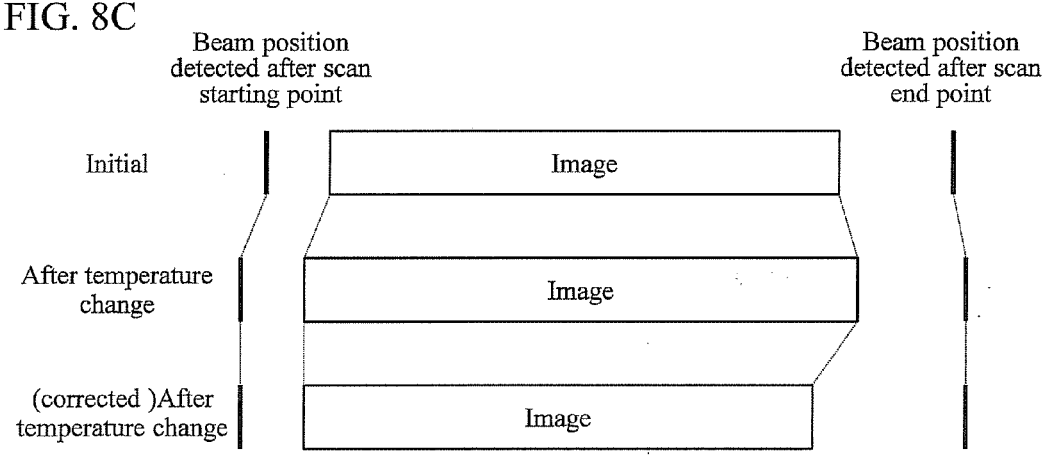

FIG. 9A    INITIAL
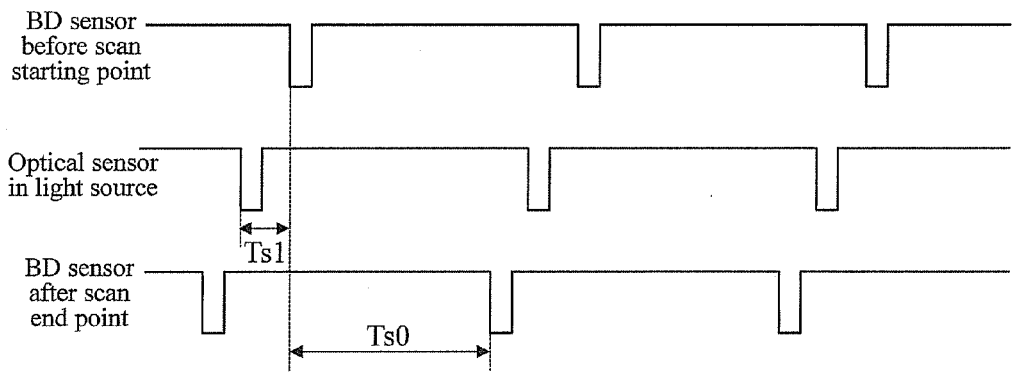
FIG. 9B    AFTER TEMPERATURE CHANGE
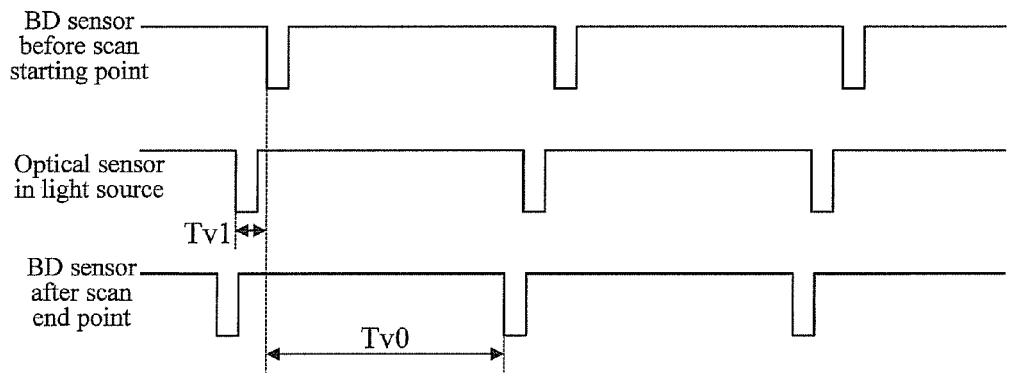
FIG. 9C
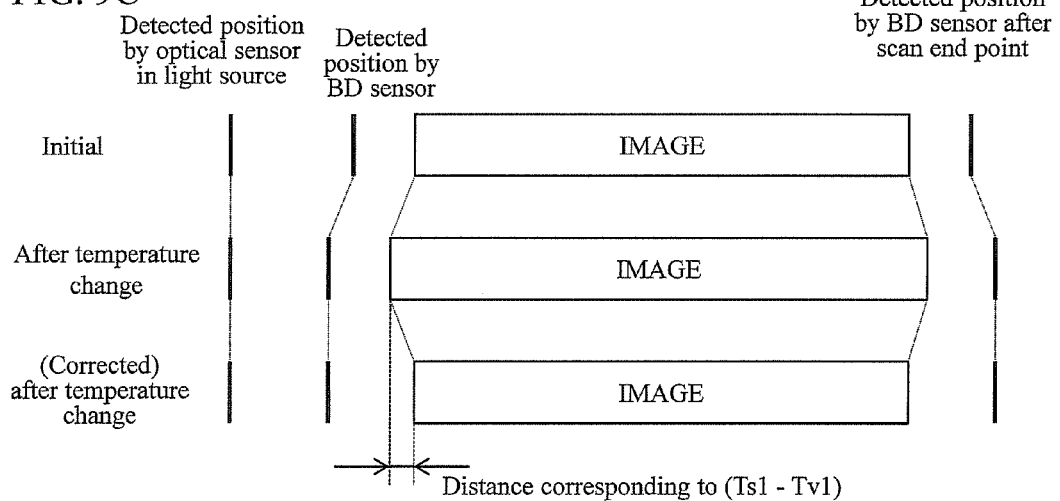

FIG. 14A  INITIAL
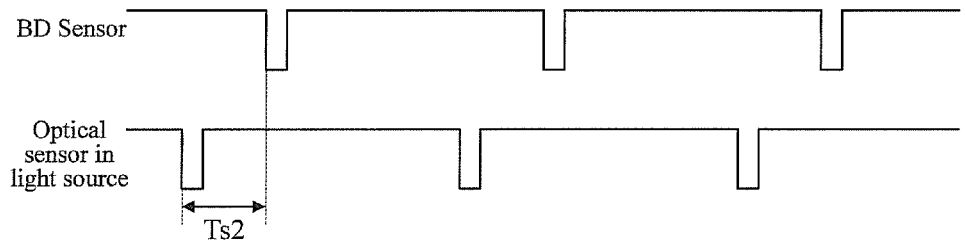
FIG. 14B  AFTER TEMPERATURE CHANGE
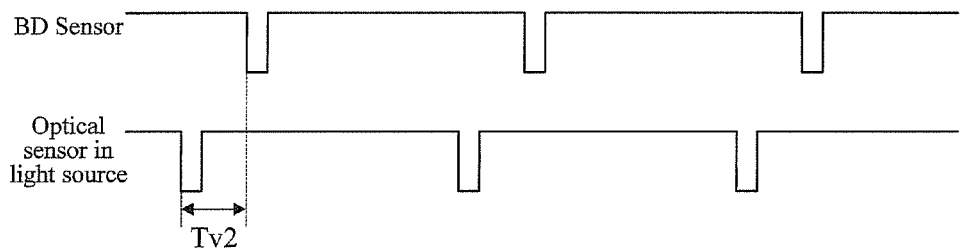
FIG. 14C
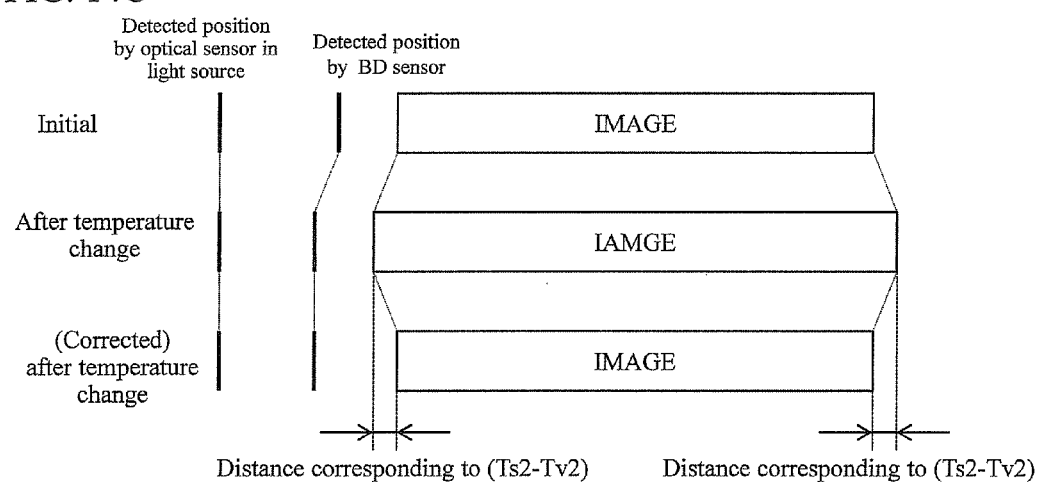

SCANNING OPTICAL APPARATUS AND IMAGE FORMING APPARATUS

CROSS-REFERENCE TO RELATED APPLICATIONS

This application claims the benefit of Japanese Application No. 2013-098389, filed May 8, 2013, in the Japanese Patent Office. All disclosures of the document(s) named above are incorporated herein by reference.

BACKGROUND OF THE INVENTION

The present disclosure relates to scanning optical apparatus and image forming apparatus having the scanning optical apparatus.

The electro-photographic type of image forming apparatus like the printer and the copying machine forms a latent image on the photoreceptor (photoconductor durum) by scanning the light beams. Such light beam scanning is carried out by the scanning optical apparatus. The scanning optical apparatus is provided with laser diode (LD) as a light source, collimator lenses, cylindrical lenses, a rotary polyhedron (polygon mirror), and f-θ lenses. In the scanning optical apparatus, the emitted light beam from the light source being modulated based on an image to be formed is deflected by the rotary polyhedron, and the deflected light beam scans on the photoconductor drum in the main scanning direction. The rotary polyhedron is provided with a plurality of surfaces (five surfaces in case of pentagonal prism shape) for reflecting the light beam and a rotation axis, and the rotation axis is driven to rotate toward one direction by a driving motor.

The above-mentioned scanning optical apparatus uses plastic lenses to the scanning optical system, such as the f-θ lens penetrating the light beams deflected by the rotary polyhedron, in order to down-size and reduce cost. In case of using the plastic lens, the index of reflection varies as well as the plastic lens expands with heat to change its shape because of the change of the environmental temperature and the temperature change in the device. For instance, even if the temperature in the scanning optical apparatus is 20° C. before starting the continuous paper printing, the temperature sometimes happens to increase up to 50° C. at the end of the continuous paper printing. Since the scanning optical apparatus is accommodated in a housing made of plastic, the installation positions of the optical components change a very little due to the thermal expansion of the housing caused by the temperature change. As a result, it occurs that the scan starting point and the scan end point for the image change on the photoconductor drum, and the picture quality of the image is deteriorated.

As countermeasures for the above-mentioned problems, it is known as a conventional art that detecting sensors (BD sensors) for detecting the light beam are arranged at a specific position before the san start and at a specific position after the scan end respectively. In the conventional art, the magnification errors in the main scanning direction is corrected by adjusting the scanning time (between the scan start time and the scan end time) according to the time interval of the light beams detected by two sensors.

There is a configuration that the scanning optical apparatus is not provided with the reflective mirror and the photo diode (BD sensor) for generating the scan-start signal in order to reduce the number of components and simplify the assembling adjusting operation. In such configuration, the light emitted from a laser oscillator that is a power source is reflected by the scanning mirror and then returns to the laser oscillator, and the returned light is detected to be the scan start signal. The returned light is detected by a disorder signal generated in the driving current of the laser oscillator at receiving the light.

SUMMARY OF THE INVENTION

In the method disclosed in the foregoing conventional arts, however, the object to be adjusted is the relative scanning length in the main scanning direction. That is to say, with respect to the length in the main scanning direction of the latent image formed on the surface to be scanned, the length before the temperature change is identical with that after the temperature change, but with respect to the position of the latent image on the surface to be scanned (the starting position and the end position of the latent image in the main scanning direction on the photoconductor drum), the positions before and after the temperature change are not always the same. For instance, when the housing is transformed and the position of BD sensor changes, the position of the latent image on the surface to be scanned would change for the moving amount corresponding to the position change of the BD sensor. In this case, when the continuous printing of the same image is executed, even if the papers are supplied without position displacement, it occurs that the position of the image printed first on the paper is different from the position of the image printed last on the paper.

In accordance with an aspect of the present disclosure, a scanning optical apparatus includes a light source, a rotatory polyhedron, a BD (Beam Detect) sensor, a light beam detecting unit, an optical sensor in the light source, a return light beam detecting unit, a calculation unit, and a scan adjusting unit. The light source is composed of a laser diode. The rotary polyhedron has reflective surfaces for reflecting a light beam emitted from the light source, deflects the light beam emitted from the light source by moving the reflective surfaces, and scans the light beam on a surface to be scanned in a main scanning direction. The light beam reflected by the reflective surface constituting the rotary polyhedron is incident on the Beam Detect sensor. The light beam detecting unit detects, based on an output of the Beam Detect sensor, the light beam reflected by the reflective surface that is incident on the Beam Detect sensor. The optical sensor in the light source is disposed on an optical axis of the light beam and on a side opposite to the light beam emitting side, on which the light beam reflected by the reflective surface is incident, and detects the intensity of the incident light beam. The return light beam detecting unit detects, based on an output of the optical sensor in the light source, the light beam reflected by the reflective surface that is incident on the optical sensor in the light source. The calculation unit calculates a time interval between the time when the light beam detecting unit detects the light beam incident on the BD sensor and the time when the return light beam detecting unit detects the light beam incident on the optical sensor in the light source. The scan adjusting unit adjusts a luminescence time of the light source for scanning the light beam on the surface to be scanned, based on the time interval calculated by the calculation unit.

In accordance with the other aspect of the present disclosure, it is possible to provide with an image forming apparatus including the above-mentioned scanning optical apparatus. That is to say, the image forming apparatus in accordance with the other aspect of the present disclosure includes the above-mentioned scanning optical apparatus, an image carrier, a charging device, and a developing device. The image carrier carries a toner image transferred to an object to be transferred. The charging device charges an image carrier surface of the image carrier. The developing device sticks toner on a latent image formed by developing the image carrier surface by the scanning optical apparatus, and forms a toner image corresponding to the latent image on the image carrier surface.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 8A, FIG. 8B, and FIG. 8C are diagrams showing the operation principles of the multifunction peripheral in accordance with an embodiment of the present disclosure.

FIG. 9A, FIG. 9B, and FIG. 9C are diagrams showing the operation principles of the multifunction peripheral in accordance with an embodiment of the present disclosure.

FIG. 14A, FIG. 14B, and FIG. 14C are diagrams showing the operation principles of the other multifunction peripheral in accordance with an embodiment of the present disclosure.

DETAILED DESCRIPTION OF THE EMBODIMENTS

The embodiments of the present disclosure will be more specifically explained hereinafter with reference to the attached drawings. The present disclosure is materialized by a digital multifunction peripheral having an exposing device that is a scanning optical apparatus.

Figure 1:
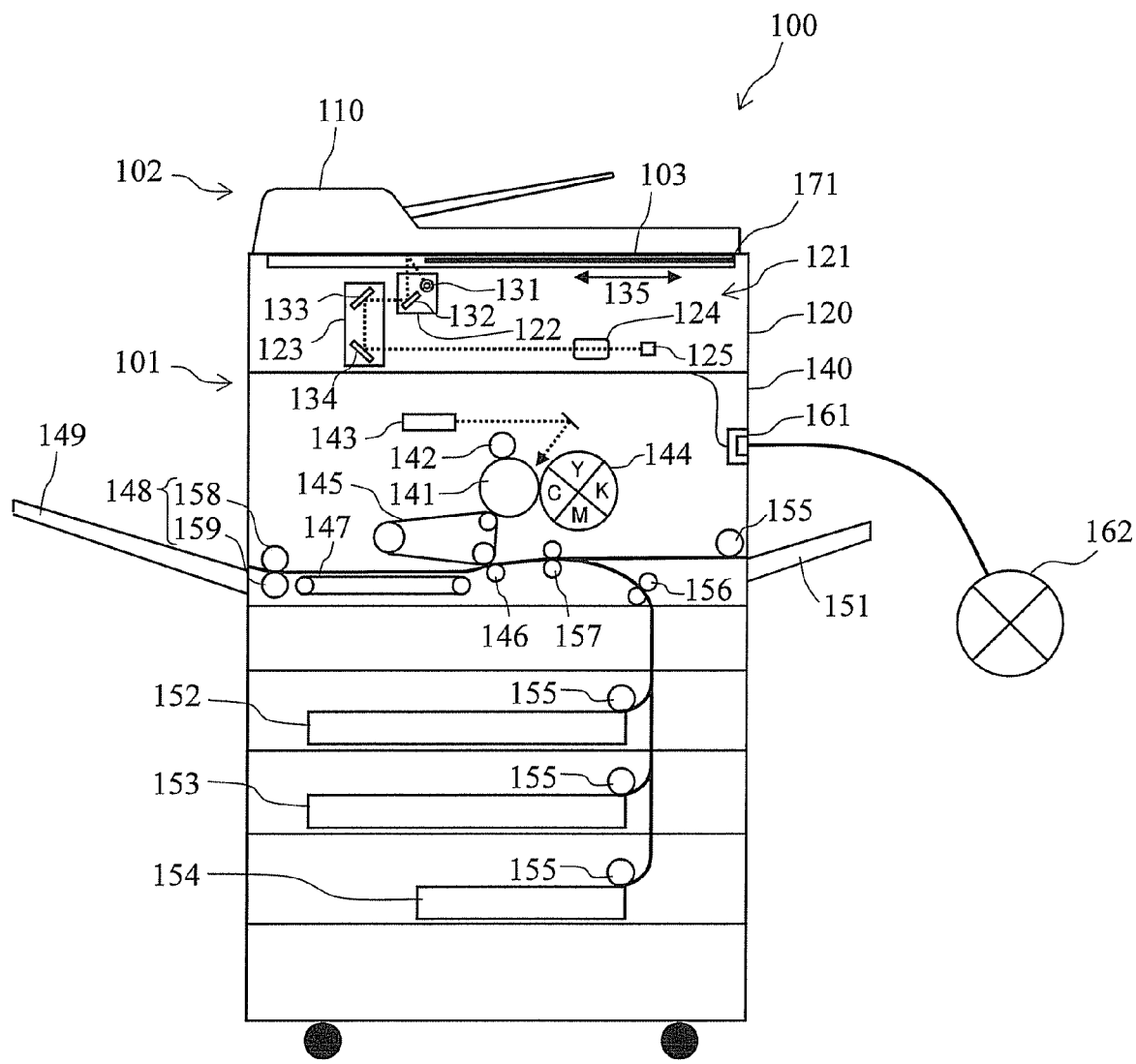
FIG. 1 is a schematic block diagram showing an entire structure of a multifunction peripheral in accordance with an embodiment of the present disclosure.

FIG. 1 is a schematic block diagram showing an entire structure of the digital multifunction peripheral in this embodiment. As shown in FIG. 1, the multifunction peripheral 100 includes a base machine 101 having an image reading unit 120 and an image forming unit 140, and a platen cover 102 placed over the base machine 101 so as to be opened and closed. An original plate 103 is arranged on a top surface of the base machine 101. The platen cover 102 is provided with a document feeder 110. The multifunction peripheral 100 is provided on its front side with an operation panel 171 whereby user can give the multifunction peripheral 100 a copy start instruction and other instructions, and also confirm a status or setting of the multifunction peripheral 100.

The image reading unit 120 is disposed below the original plate 103. The image reading unit 120 reads an image of an original by a scanning optical system 121, and creates digital data (image data) of the image. The original can be placed on the original plate 103 or the document feeder 110. The scanning optical system 121 includes a first carriage 122 and a second carriage 123, and a condenser 124. The first carriage 122 is provided with a linear light source 131 and a mirror 132, and the second carriage 123 is provided with mirrors 133 and 134. The light source 131 illuminates the original. The mirrors 132, 133 and 134 guide the light reflected from the original to the condenser 124, and the condenser 124 forms a light image on a light receiving surface of a line image sensor 125.

In the scanning optical system 121, the first carriage 122 and the second carriage 123 are mounted so as to reciprocate in a sub scanning direction 135. The image sensor 125 can read the image of the original placed on the original plate 103 by moving the first carriage 122 and the second carriage 123 in the sub scanning direction 135. In case of reading the image of the original placed on the document feeder 110, the image reading unit 120 temporarily stops the first carriage 122 and the second carriage 123 so as to correspond to an image reading position, and then reads the image of the original passing through the image reading position by the image sensor 125. The image sensor 125 creates the image data of the original corresponding to each color component of R (red), G (green), and B (blue) from the light image incident on the light receiving surface, for example. The created image data can be printed out on the paper by an image forming unit 140. The image data also can be sent to other devices (not show in the drawing) from network interface 161 via network 162.

The image forming unit 140 prints out on papers the image data obtained by the imager reading unit 120 or the image data received from the other device (not shown in the drawing) connected with the network 162. The image forming unit 140 has a photoconductor drum 141 as an image carrier. The photoconductor drum 141 rotates at a specific speed in a direction. Around the photoconductor drum 141, a charging device 142, an exposing device (a scanning optical apparatus) 143, a developing device 144 and an intermediate transfer belt 145 are disposed in order from an upstream side in the rotation direction of the photoconductor drum 141. The charging device 142 uniformly charges a surface of the photoconductor drum 141. The exposing device 143 radiates light on the uniformly charged surface of the photoconductor drum 141 according to the image data, and forms a latent image on the photoconductor drum 141. The developing device 144 sticks toner on the latent image and forms a toner image on the photoconductor drum 141. The intermediate transfer belt 145 transfers the toner image formed on the photoconductor drum 141 to the paper. When the image data is a color image, the intermediate transfer belt 145 transfers each color of toner image to a same paper. The RGB type of color image is converted to the image data in a form of C (cyan), M (magenta), Y (yellow), and K (black), and each color component of the image data is inputted to the exposing device 143.

The image forming unit 140 feeds a paper from a manual paper feed tray 15 or paper feed cassettes 152, 153, and 154 to a transfer unit between the intermediate transfer belt 145 and a transfer roller 146, the paper that is an object to transfer thereto. The various size of papers can be placed on the manual paper feed tray 15 or be accommodated in the paper feed cassettes 152, 153, and 154. The image forming unit 140 selects the paper specified by user or the paper corresponding to a size of original detected automatically, and then feeds the selected paper from the manual paper feed tray 15 or the paper feed cassettes 152, 153, and 154 through a feed roller 155. The supplied paper is conveyed to the transfer unit by a conveyance roller 156 and a resist roller 157. The paper on which the toner image is transferred is conveyed to a fixing device 148 by a fixing roller 158 and a pressure roller 159. The fixing device 148 has the fixing roller 158 including a heater, and the pressure roller 159, and the toner image is fixed on the paper by the heat and the pressure. The image forming unit 140 ejects the paper passing through the fixing device 148 to a copy receiving tray 149.

Figure 2:
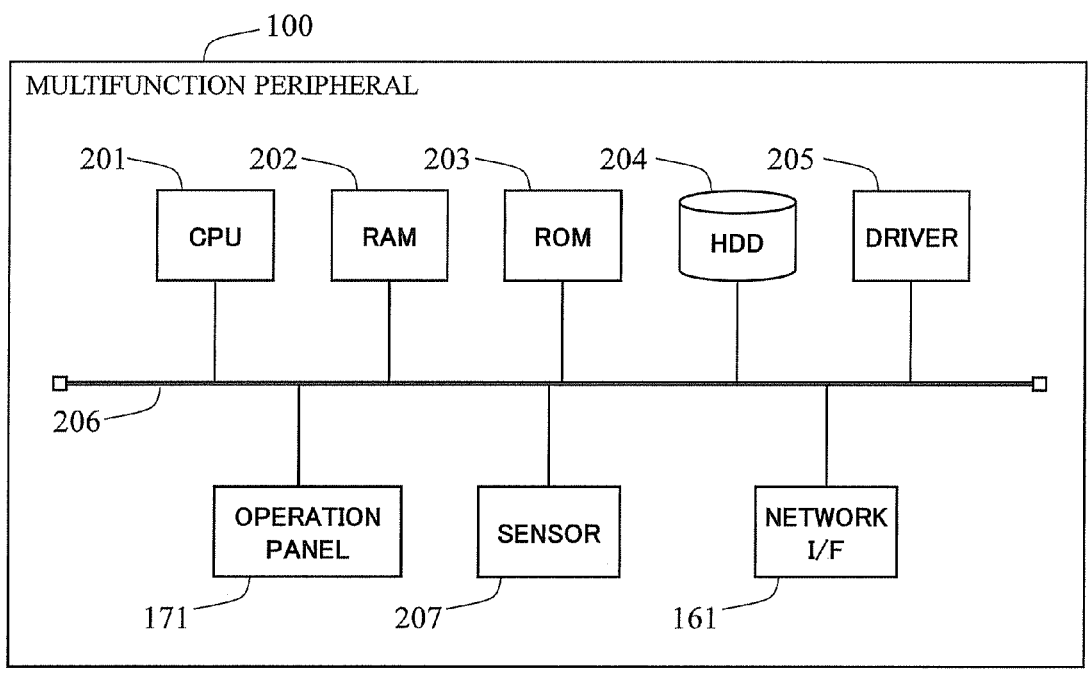
FIG. 2 is a diagram showing a hardware structure of the multifunction peripheral in accordance with an embodiment of the present disclosure.

FIG. 2 is a hardware block diagram of control units for the multifunction peripheral. In the multifunction peripheral 100 in this embodiment, CPU (Central Processing Unit) 201, RAM (Random Access Memory) 202, ROM (Read Only Memory) 203, HDD (Hard Disk Drive) 204, and a driver 205 corresponding to driving units of the document feeder 110, the image reading unit 120, and the image forming unit 140 are connected via an internal path 206. ROM 203 and HDD 204 stores programs, and CPU 201 controls the multifunction peripheral 100 according to instructions from the control programs. For instance, CPU 201 uses RAM 202 as a working area, and sends and receives the instruction and the data from and to the driver 205, whereby the working of each driving unit can be controlled. HDD 204 is also used for storing the image data received from the other devise via network interface 161.

The internal path 206 is also connected with the operation panel 171 and various sensors 207. The operation panel 171 receives the user operation, and supplies a signal based on the operation to CPU 201. The operation panel 171 displays an operation screen on a display provide to the operation panel 171 according to the control signal from CPU 201. The sensor 207 includes various sensors, such as an open and shut detecting sensor for detecting the opening and the shutting of the platen cover 102, an original detecting sensor for detecting an original on the original plate 103, a temperature detecting sensor for detecting the temperature of the fixing device 148, a paper detecting sensor for detecting the paper or the original to be conveyed, and so on.

CPU 201 can materialize under-mentioned respective means (functional blocks) by executing the programs stored in ROM 203, and it can control the working of each means corresponding to the signals from the sensors.

Figure 3:
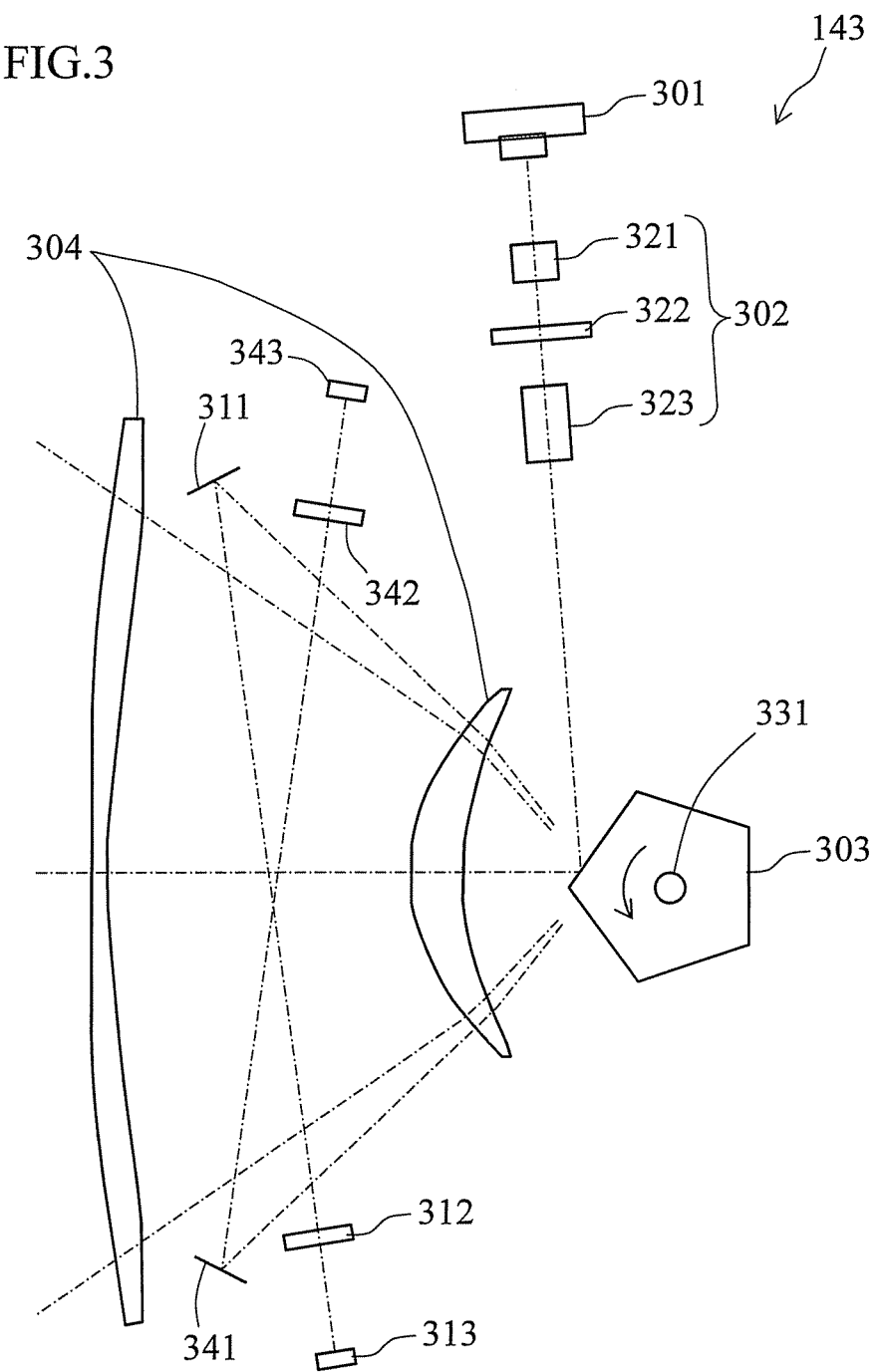
FIG. 3 is a schematic diagram showing an exposing device in accordance with an embodiment of the present disclosure.

FIG. 3 is a schematic diagram showing a structure of the exposing device 143 mounted in the multifunction peripheral 100. The exposing device 143 includes a light source 301, an incident optical system 302, a rotary polyhedron 303, and a scanning optical system 304 in the housing not shown in the drawing. FIG. 3 shows an exemplification of a structure that the light beam path does not have a return, but it is possible to use a structure for retuning the light beam path by a return mirror.

The light source 301 consists of a laser diode (laser oscillator) implemented on a circuit board. The circuit board modulates the intensity of the light beam (laser light) emitted from the laser diode according to an image signal inputted from outside.

The incident optical system 302 includes a collimator lens 321, an aperture 322, and a cylindrical lens 323. The light beam emitted from the light source 301 is incident on the collimator lens 321. The collimator lens 321 consists of a cylindrical-shaped glass lens or the like, and converts the light beam emitted from the laser diode to a parallel beam, and then outputs the beam. The light beam passing through the collimator lens 321 is incident on a reflective surface of the rotary polyhedron 303 through the aperture 322 consisting of a metal plate or the like having a through hole and the cylindrical lens 323 made of quart glass or the like. The luminescence point of the laser diode is disposed on a focus of the collimator lens 321.

The rotary polyhedron 303 has reflective surfaces for reflecting the light beam emitted from the light source 301, and functions as a deflector that makes the light beam emitted from the light source 301 scan the surface of the photoconductor drum 141 to be scanned in the main scanning direction by moving the reflective surface. The rotary polyhedron 303 has a rotation axis 331 disposed in a vertical direction to the scanning direction of the light beam on the surface of the photoconductor drum 141. The rotation axis 331 rotates in one direction (the direction shown by an arrow in FIG. 3) by a driving motor consisting of a flat motor not shown in the drawing. The rotary polyhedron 303 in this embodiment is in the shape of pentagonal prism having the same size of five rectangular reflective surfaces disposed around the rotation axis 313. The driving motor is supported by a highly heat-conductive plate-like member like aluminum alloy so as to transfer the heart, and the plate-like member is installed in the housing. A part of the plate-like member is exposed to the outside of the housing, which consists a heat radiation unit. The cylindrical lens 323 allows the light beams to form an image on the reflective surface of the rotary polyhedron 303 in a state that only the light beams in the sub scanning direction are converged.

The light beam deflected by the rotation of the rotary polyhedron 303 incident on the scanning optical system 304. In the embodiment, the scanning optical system 304 is a f-θ lens consisting of two acrylic lenses. The scanning optical system 304 allows the light beam deflected by the rotary polyhedron 303 to form an image with spots on the surface of the photoconductor drum in a state that the scanning speed on the photoconductor drum 141 becomes almost the same.

The exposing device 143 is provided with a BD optical system on the side of the scan starting point for creating a reference signal for starting the image forming on the photoconductor drum 141. The BD optical system on the side of the scan starting point is provided with a return mirror 311, a cylindrical lens 312, and a Beam Detect (BD) sensor 313.

As shown in FIG. 3, the return mirror 311 is placed at a position through which the light beams passes just before the light beam reflected on one reflective surface of the rotary polyhedron 303, along with the rotation of the rotary polyhedron 303, scans on the photoconductor drum 141.

The light beam reflected by the return mirror 311 is incident on the BD sensor provided with a light receiving element like a photodiode through the cylindrical lens 312. The cylindrical lens 312 allows the light beam to form an image on a light receiving surface of the BD sensor 313.

The exposing device 143 is provided with a BD optical system on the side of the scan end point for detecting the end of the scanning on the photoconductor drum 141 by the light beam. The BD optical system of the scan end point is provided with a return mirror 341, a cylindrical lens 342, and a BD sensor 343, in the same manner as the above-mentioned BD optical system.

As shown in FIG. 3, the return mirror 341 placed at a position through which the light beams passes immediately after the light beam reflected on one reflective surface of the rotary polyhedron 303, along with the rotation of the rotary polyhedron 303, scans on the photoconductor drum 141.

The light beam reflected by the return mirror 341 is incident on the BD sensor provided 343 with a light receiving element like a photodiode through the cylindrical lens 342. The cylindrical lens 342 allows the light beam to form an image on the light receiving surface of the BD sensor 343.

FIG. 3 illustrates, for convenience of explanation, an optical axis of the light beam when the light beam is incident on the BD optical system on the side of the scan starting point, an optical axis of the light beam when the scanning starts on the photoconductor drum 141, and an optical axis of the light beam when the scanning ends on the photoconductor drum 141, and an optical axis of the light beam when the light beam is incident on the BD optical system on the side of the scan end point, in addition to an optical axis of the light beam when the rotary polyhedron 303 is in a state shown in the drawing.

As described above, in the exposing device 143, the optical path from the light source 301 to the rotary polyhedron 303 consists of a member having a small heat expansion like glass or metal, and the rotator polyhedron 303 takes measures for heat radiation. Therefore, the heat expansion caused by the temperature change is remarkably smaller than the scanning optical system 304 consisting of the plastic member. However, the present disclosure is not limited to this configuration.

Figure 4:
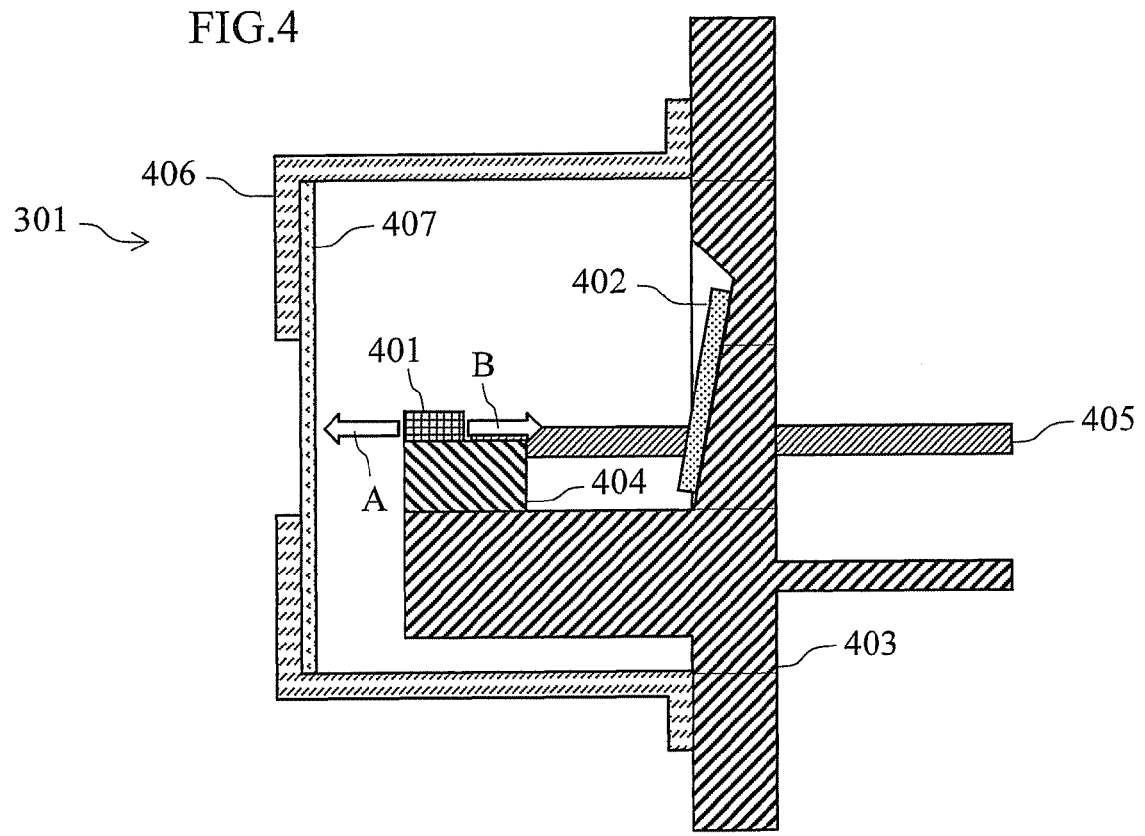
FIG. 4 is a schematic cross sectional diagram showing a structure of a light source provided to the exposing device in accordance with an embodiment of the present disclosure.

The structure of the light source 301 is discussed hereinafter. FIG. 4 is a schematic view showing the light source 301 included in the multifunction peripheral 100. The light source 301 has a laser diode 401 fixed to a stem 403 through a sub-mount 404. The driving power is supplied to the laser diode 401 through an electrode 405 that goes through the stem 403 and reaches to the laser diode 401. The stem 403 and the electrode 405 are implemented to the circuit board not shown in the drawing. The laser diode 401 is sealed by a cap 406 fixed to the stem 403. The cap 406 has an opening blocked with a cover glass 407 at a position opposite to a light beam emitting end of the laser diode 401. The light beam emitted from the light beam emitting end of the laser diode 401 goes outside through the cover glass 407.

The laser diode 401 emits the light beam not only to a direction A forwarding to the cover glass 407 but also to a direction B opposite to the direction A. At a position facing to the emitting end of the light beams forwarding to the direction B, an optical sensor 402 built in the light source consisting of light receiving elements like photodiodes is disposed. The optical sensor 402 in the light source is used for monitoring the intensity of the light beam. That is to say, the intensity of the light beam to be emitted outside through the cover glass 407 is adjusted based on the intensity of the light beam detected by the optical sensor 402 in the light source.

Figure 5:
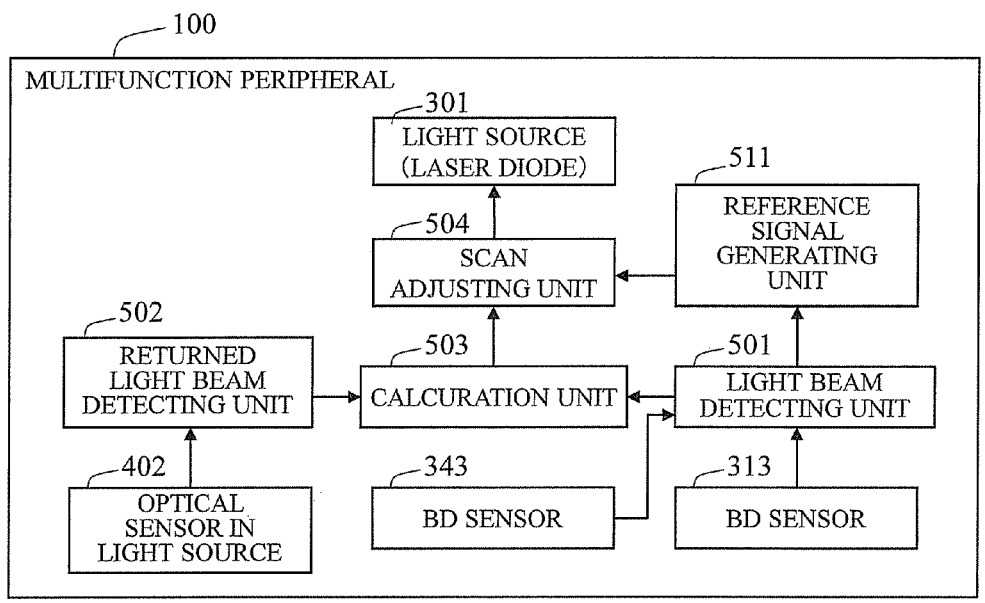
FIG. 5 is a functional block diagram showing the multifunction peripheral in accordance with an embodiment of the present disclosure.

FIG. 5 is a functional block diagram of the multifunction peripheral in the embodiment of the present disclosure. As shown in FIG. 5, the multifunction peripheral 100 in the embodiment includes a light beam detecting unit 501, a return light beam detecting unit 502, a calculation unit 503, and a scan adjusting unit 504.

The light beam detecting unit 501 detects the light beam that is incident on the BD sensor 313 after being deflected by the reflective surface of the rotary polyhedron 303 based on an output of the BD sensor 313. In the embodiment, the light beam detecting unit 501 determines that the light beam deflected by the reflective surface is incident on the BD sensor 313 when the output of the BD sensor 313 is a predetermined threshold value and more. Although the structure is not particularly limited, the beam detecting unit 501 in the embodiment is configured so as to also detect the light beam that is incident on the BD sensor 343 after being deflected by the reflective surface of the rotary polyhedron 303 based on the output of the BD sensor 343. Specifically, the light beam detecting unit 501 determines that the light beam deflected by the reflective surface is incident on the BD sensor 343 when the output of the BD sensor 343 is a predetermined threshold value and more.

The return light beam detecting unit 502 detects the light beam that is incident on the optical sensor 402 in the light source after being deflected by the reflective surface based on an output of the optical sensor 402 in the light source. In the embodiment, the return light beam detecting unit 502 determines that the light beam deflected by the reflective surface is incident on the optical sensor 402 in the light source when the output of the optical sensor 402 in the light source is a predetermined threshold value and more. Besides, it is not necessary to dispose the light beam detecting unit 501 and the return light beam detecting unit 502 independently, and one unit may include the function of the other unit.

The calculation unit 503 calculates a time interval between when the light beam detecting unit 501 detects the light beam incident on the BD sensor 313 and when the return light beam detecting unit 502 detects the light beam incident on the optical sensor 402 in the light source.

The scan adjusting unit adjusts a luminescence time of the light source based on the time interval calculated by the calculation unit 503, the luminescence time for allowing the light beam to scan on the surface to be scanned. The adjustment can be carried out by changing the frequency of a clock signal inputted to the light source 301 in order to instruct the emission time of the light beam corresponding to the image data, for example.

The multifunction peripheral 100 in the embodiment is further provided with a reference signal generating unit 511. The reference signal generating unit 511 generates a reference signal for the scan starting for scanning the light beams deflected by the reflective surface on the surface to be scanned when the light beam detecting unit 501 detects the light beam incident on the BD sensor 313. For instance, the reference signal generating unit 511 generates a pulse signal when the light beam detecting unit 501 determines that the light beam is incident on the BD sensor 313. For instance, the clock signal is inputted to the light source 301 based on the pulse signal, that is, when a specific time passed after the generation of the pulse signal, and then the light source 301 starts emitting the light beam corresponding to the image data.

Figure 6A:
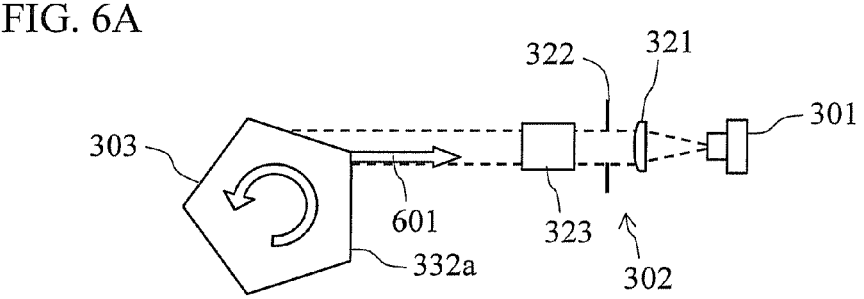
FIG. 6A and FIG. 6B are schematic views showing the operation of the exposing device in accordance with an embodiment of the present disclosure.
Figure 6B:
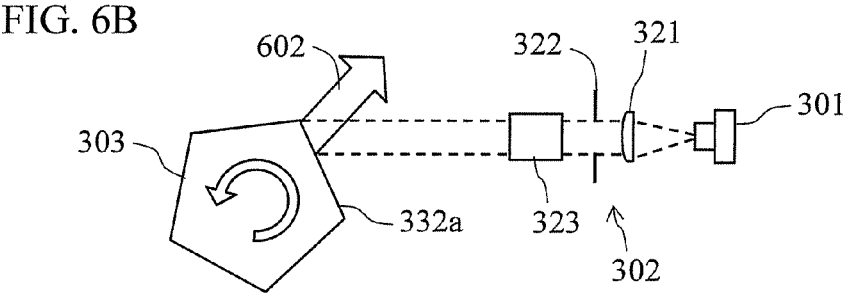

FIG. 6 is a schematic view of the exposing device of the multifunction peripheral in the embodiment. FIG. 6A corresponds to a state that the light beam reflected by the reflective surface 332a is incident on the optical sensor 402 in the light source, and FIG. 6B corresponds to a state that the light beam reflected by the reflective surface 332a is incident on the BD sensor 313. In FIG. 6A and FIG. 6B, a void arrow labeled on the rotary polyhedron 303 indicates a rotation driving direction of the rotary polyhedron 303.

As understood from FIG. 6A and FIG. 6B, one reflective surface 332a constituting the rotary polyhedron 303 turns to be a state shown in FIG. 6A and a state shown in FIG. 6B in order along with the rotation of the rotary polyhedron 303.

In the state shown in FIG. 6A, the light beam emitted from the light source 301 and passing through the rotary polyhedron 303 is reflected at an end (a lower end) of the rotation direction of the reflective surface 332a that is perpendicular to the optical axis of the light beam. The reflected light beam 601 is incident on the light source 301 through the incident optical system 302, that is, the light beam 601 is incident on the optical sensor 402 in the light source.

In the state shown in FIG. 6B, the light beam emitted from the light source 301 and passing through the incident optical system 302 is reflected at the end of the rotational direction of the reflective surface 332a. The reflected light beam 602 is incident on the BD optical system on the side of the scan starting point. That is to say, the light beam 602 is incident on the BD sensor 313. Besides, the relation shown in FIG. 6A and FIG. 6B are established regarding the respective reflective surface 332 constituting the rotary polyhedron 303, too.

Figure 7:
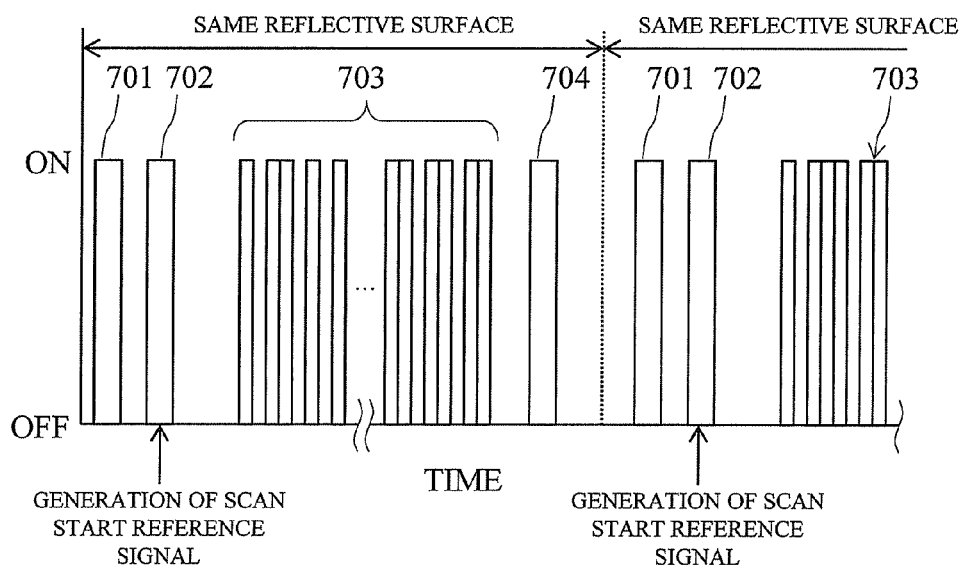
FIG. 7 is a time chart showing a state of ON/OFF of the light source of the exposing device in accordance with an embodiment of the present disclosure.

As shown in FIG. 6A, in order to allow the light beam reflected by the rotary polyhedron 303 to enter the optical sensor 402 in the light source, it is necessary to let the light source 301 light when each reflective surface of the rotary polyhedron 303 is nearly perpendicular to the optical axis of the light beam. Therefore, it is configured in the embodiment so as to light the light source 301 around the perpendicular state based on the scan start reference signal generated by the reference signal generating unit 511. FIG. 7 illustrates a state of ON (light)/OFF (light out) of the light source 301. In FIG. 7, a horizontal axis corresponds to time, and a vertical axis corresponds to ON/OFF of the light source 301.

As described above, the light source 301 starts emitting the light beam corresponding to the image data when the specific time passed after the scan start reference signal. In FIG. 7, the emission of the light beam corresponding to the image data is illustrated by a blinking group 703. Besides, the emission of the light beam is carried out according to the clock signal adjusted by the scan adjusting unit 504.

In addition, a lighting 702 indicates the lighting of the light source 301 allowing the light beam to enter the BD sensor 313. The lighting 702 is based on a previous scan start reference single and performed when the specific time corresponding to the number of rotations of rotary polyhedron 303 has passed after the previous scan start reference signal. When the light beam detecting unit 501 detects the light beam that is incident on the BD sensor 313 during the lighting 702, the reference signal generating unit 511 generates the scan start reference signal. In the same manner, the lighting 704 of the light source 301 allowing the light beam to enter the BD sensor of the BD optical system on the side of the scan end point is performed when the specific time corresponding to the number of rotations of the rotary polyhedron 303 has passed after the generation of the scan start reference signal.

As shown in FIG. 7, the lighting 701 of the light source 301 allowing the light beam to enter the optical sensor 402 in the light source is performed after the ending of the blinking group 702 and the generation of the scan star reference signal but before the lighting 702 allowing the light beam to enter the next BD sensor 313. The lighting 701 is based on the previous scan start reference signal, but the light beams in the lighting 702 and the blinking group 703 following to the lighting 701 are reflected by the same reflective surface as understood from FIG. 6A and FIG. 6B. It is configured in the embodiment so as to light and light out the light source, if necessary, in a range to scan the light beam on the photoconductor drum 141, but the lighting of the light source may be continued within the range.

In the embodiment, the adjusting of the intensity of the light beam is executed after the lighting 701 of the light source 301 allowing the light beam to enter the optical sensor 402 in the light source and before the lighting 702 for making the light beam enter the BD sensor 313.

Next, the operation principles of the exposing device installed in the multifunction peripheral in the embodiment is explained hereinafter. FIG. 8 and FIG. 9 are for explaining the operation principles of the exposing device 143. FIG. 8 is the diagram for explaining the method of correcting an image length in the main scanning direction under a conventional structure wherein the BD sensors are disposed respectively at a specific position on the photoconductor drum before the scan starting and at a specific position of the photoconductor drum after the scan end. FIG. 9 is the diagram for explaining the method of correcting the image length in the main scanning direction under the structure in this embodiment as mentioned above.

Besides, FIG. 8A shows a detection result of the BD sensors at an initial stage when the temperature in the housing of the exposing device does not rise. FIG. 8B shows a detection result of the BD sensors at a stage after the temperature in the housing of the exposing device has risen. In FIG. 8A and FIG. 8B, a high level signal corresponds to a state of no incident light beam, and a low level signal corresponds to a state that the incident light beam exists. FIG. 8C is a diagram schematically illustrating a relation between a position of the light beam detected by BD sensors and an image length in the main scanning direction regarding the initial stage and the stage after the temperature change.

Likewise, FIG. 9A shows a detection result of the light beam detecting unit 501 and the return light beam detecting unit 502 at the initial stage when the temperature in the housing of the exposing device 143 does not rise. FIG. 9B shows a detection result of the light beam detecting unit 501 and the return light beam detecting unit 502 at the stage after the temperature in the housing of the exposing device 143 has risen. In FIG. 9A and FIG. 9B, the high level signal corresponds to a state of no incident light beam, and the low level signal corresponds to a state that the incident light beam exists. FIG. 9C is a diagram schematically illustrating the relation between the position of light beam detected by the BD sensor 313, the optical sensor 402 in the light source, and the BD sensor 343 and the image length in the main scanning direction regarding the initial stage and the stage after the temperature change.

According to the conventional method, as shown in FIG. 8A, the BD sensor before the scan starting point detects the light beam just before the start of the scanning of the light beam corresponding to the image data, and the BD sensor after the scan end point detects the light beam immediately after the start of the scanning of the light beam. Under such status, the time interval between the light beam detection (a fall position) by the BD sensor before the scan starting point and the light beam detection (a fall position) by the BD sensor after the scan end point is defined as Ts0.

When the temperature of the exposing device has risen, the scanning optical system expands with heat (the shape change) and the index of refraction changes, with the result that the light beam detection time of the BD sensor before the scan starting point and the BD sensor after the scan end point moved, as shown in FIG. 8B. Under such status, the time interval between the light beam detection (a fall position) by the BD sensor before the scan starting point and the light beam detection (a fall position) by the BD sensor after the scan end point is defined as Tv0. Besides, in this example, the time interval Ts0<the time interval Tv0.

In this case, regarding the length of the image formed between the BD sensor before the scan starting point and the BD sensor after the scan end point, the image length at the stage after the temperature change (see "after the temperature change", FIG. 8C) becomes longer than the image length at the initial stage (see "initial", FIG. 8C). Under such state, when the scanning of the light beam corresponding to the image data is executed in the scanning time shortened to (Ts0/Tv0) times, for example, the image length in the main scanning direction can be made to be the same as that at the initial stage, as shown in FIG. 8C, the stage "(corrected) after the temperature change".

The scanning of the image data, however, starts when the specific time passes after the light beam was detected by the BD sensor before the scan starting point. Accordingly, as shown in FIG. 8C, the stage "(corrected) after the temperature change", when the light beam position detected by the BD sensor before the scan starting point is different from the position at the initial stage due to the temperature change, the scan starting point for the image becomes also different from the position at the initial stage.

On the contrary, in the exposing device 143 in the embodiment, the light beam detecting unit 501 detects the light beam that is incident on the BD sensor 313 just before the scanning of the light beam corresponding to the image data starts, and the return light beam detecting unit 502 detects the light beam that is incident on the optical sensor 402 in the light source just before the detection of the light beam detecting unit 501. And the light beam detecting unit 501 detects the light beam that is incident on the BD sensor 343 immediately after the scanning of the light beam corresponding to the image data is performed. Under such state, the time interval between the light beam detection (the fall position) of the BD sensor 313 and the light beam detection (the fall position) of the BD sensor 343 is defined as Ts0. The time interval between the light beam detection (the fall position) of the optical sensor 402 in the light source (the return light beam detecting unit 502) and the light beam detection (the fall position) of the BD sensor 313 (the light beam detecting unit 501) is defined as Ts1.

When the temperature of the exposing device 143 has risen, the scanning optical system expands with heat (the shape change) and the index of refraction changes, with the result that the detection time that the light beam detecting unit 501 detects the light beam incident on the BD sensor 313 and the light beam incident on the BD sensor 343 has changed, as shown in FIG. 9B. Because of the above-mentioned reasons, however, there is not large change of the detection time of the light beam incident on the optical sensor 402 in the light source by the return light beam detecting unit 502. Under such status, the time interval between the light beam detection (a fall position) by the BD sensor 313 and the light beam detection (a fall position) by the BD sensor 343 is defined as Tv0. In addition, the time interval between the light beam detection (a fall position) by the optical sensor 402 in the light source and the light beam detection (a fall position) by the BD sensor 313 is defined as Tv1. In this example, the time interval TS0<the time interval Tv0, and the time interval Ts1>the time interval Tv1. In this case, regarding the length in the main scanning direction of the image data formed by the light beams passing through the BD sensor 313, the image length at the stage after the temperature change (see "after the temperature change" in FIG. 9C) becomes longer than that at the initial stage (see "initial" in FIG. 9C).

As shown in FIG. 9C, at the stage after the temperature change, the positions of the BD sensor 313 and the BD sensor 343 moves, but the position of the optical sensor 402 in the light source moves little. The scanning of the image data starts when the specific time has passed after the light beam was detected by the BD sensor 313. Therefore, the scan starting point for the image at the stage of "after the temperature change" moves for the amount same as the moving amount of the position of the BD sensor 313 from the scan starting point for the image at the "initial" stage. In this structure, the position moving amount of the BD sensor 313 is a distance corresponding to a time difference (Ts1−Tv1). Accordingly, as understood by FIG. 9C, the scanning of the light beam corresponding to the image data starts when the specific time and the time difference (Ts1−Tv1) passed after the BD sensor 313 detected the light beam, so that the scan starting point for the image can be corrected to the scan starting point of the image at the "initial" stage (see "(corrected) after the temperature change" in FIG. 9C). That is to say, the absolute position of the scan starting point of the image can be corrected. Besides, the image length in the main scanning direction can be corrected by performing the scanning of the light beam corresponding to the image data in the scanning time shortened to (Ts0/Tv0) times, for example.

In the embodiment, the time interval Ts0, Tv0, Ts1, and Tv1 are calculated by the calculation unit 503. The scan adjusting unit 504 calculates a difference between the time interval Tv1 and the time interval Ts1 and a ratio of the time interval Ts0 and the time interval Tv0, and adjusts the luminescence time of the light source for scanning the light beam corresponding to the image data based on the calculated difference and ratio.

Figure 10:
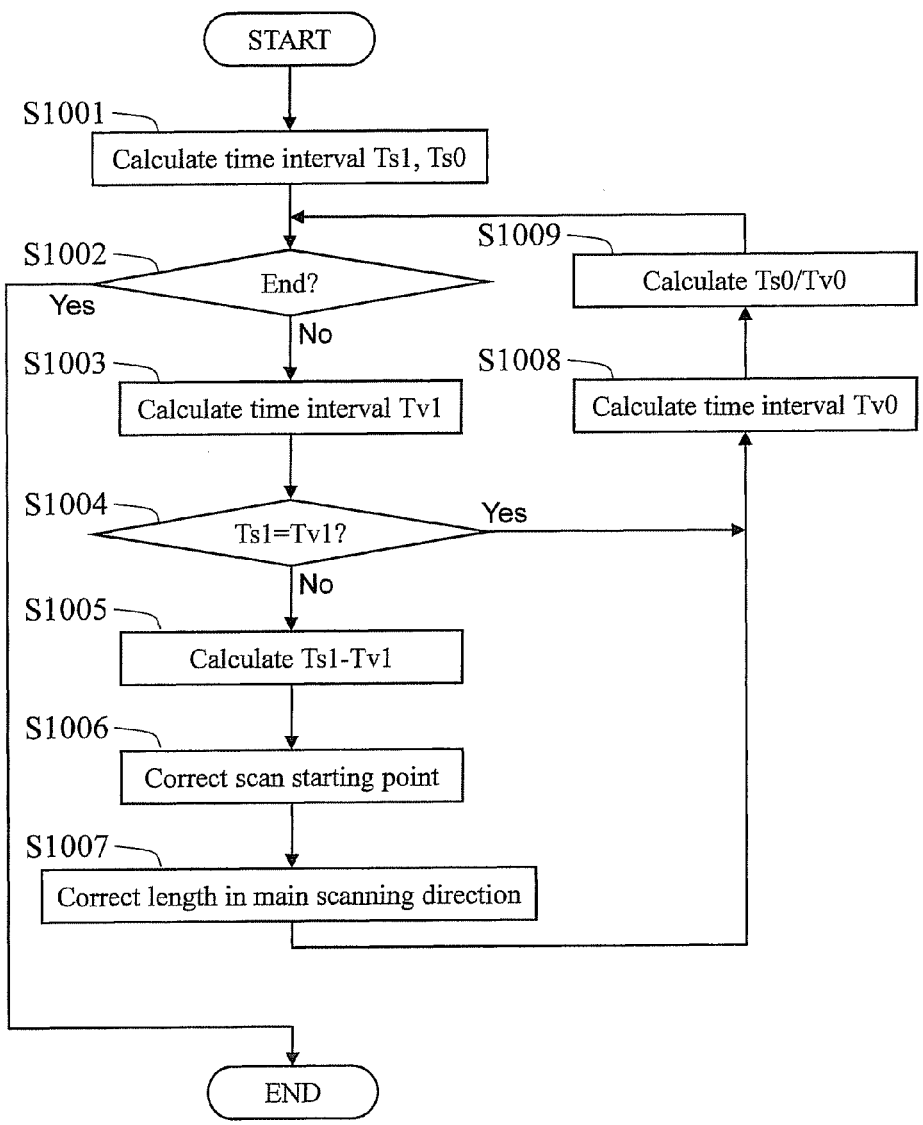
FIG. 10 is a flowchart showing an example of correction procedure performed by the multifunction peripheral in accordance with an embodiment of the present disclosure.

FIG. 10 is a flowchart showing an example of the correction procedure of the image position and the image length in the main scanning direction at the light beam scanning corresponding to the image data in the multifunction peripheral 100. The start of the procedure is triggered by a state that the exposing operation can be performed after the exposing device 143 is activated for forming a latent image and the number of rotations of the rotary polyhedron 303 is stabilized.

When the procedure starts, at the beginning, the return light beam detecting unit 502 detects the light beam that is incident on the optical sensor 402 in the light source, and then the light beam detecting unit 501 detects the light beam that is incident on the BD sensor 313. And the light beam detecting unit 501 detects the light beam that is incident on the BD sensor 343 of the BD optical system of the scan-end point side. At this time, the calculation unit 503 calculates the time interval Ts1 based on the light beam detection time of the BD sensor 313 and the light beam detection time of the optical sensor 402 in the light source (Step S1001). The calculation unit 503 inputs the calculated time interval Ts1 and Ts0 to the scan adjusting unit 504. The scan adjusting unit 504 retains the inputted time interval Ts1 and Ts0.

After that, along with the rotation of the rotary polyhedron 303, the return light beam detecting unit 502 detects the light beam incident on the optical sensor 402 in the light source, and then the light beam detecting unit 501 detects the light beam incident on the BD sensor 313. At this time, the calculation unit 503 calculates the time interval Tv1 based on the light beam detection time of the BD sensor 313 and the light beam detection time of the optical sensor 402 in the light source (Step S1002, No, S1003). The calculation unit 503 inputs the calculated time interval Tv1 to the scan adjusting unit 504. The scan adjusting unit 504 judges whether or not the inputted time interval Tv1 and the retained time interval Ts1 are the same (Step S1004). Besides, the meaning of "the same" includes not only that they coincide perfectly with each other, but that they can be considered as being equal to each other. The range to consider as being equal can be specified in the scan adjusting unit in advance. When it is determined that the time interval Tv1 and the time interval Ts1 are the same, the scan adjusting unit does not execute the correction (Step S1004, Yes).

After that, when the light beam detecting unit 501 detects the light beam incident on the BD sensor 343 of the BD optical system of the scan end point side, the calculation unit 503 calculates the time interval Tv0 based on the previous light beam detection time of the BD sensor 313 and the light beam detection time of the BD sensor 343 (Step S1008). The calculation unit 503 inputs the calculated time interval Tv0 to the scan adjusting unit 504. The scan adjusting unit 504 calculates the ratio (Ts0/Tv0) based on the inputted time interval Tv0 and the retained time interval Ts0, and the value of ratio is retained (Step S1009).

When the emission of the entire light beams corresponding to the image data is not completed, the return light beam detecting unit 502 detects the light beam incident on optical sensor 402 in the light source and then the light beam detecting unit 501 detects the light beam incident on the BD sensor 313, along with the rotation of the rotary polyhedron 303. At this time, the calculation unit 503 recalculates the time interval Tv1 based on the above-mentioned detection times, and the calculated time interval Tv1 is inputted to the scan adjusting unit 504 (step S1002, No, S1003).

When the temperature of the exposing device 143 has risen, it occurs that the scanning optical system 304 expands with heat (the shape change) and the index of refraction changes, with the result that the time interval Tv1 calculated by the calculation unit 503 changes gradually. Therefore, when the change becomes larger, the adjusting unit 504 determines that the inputted time interval Tv1 and the retained time interval Ts1 are not the same (step S1004, No). When it is determined that the time interval Tv1 and the time interval Ts1 are not the same, the scan adjusting unit 504 calculates the difference (Ts1−Tv1) between the time interval Tv1 inputted by the calculation unit 503 and the time interval Ts1 retained therein (step S1005).

The scan adjusting unit 504 that has calculated the time difference (Ts1−Tv1) corrects the scan starting point of the light beam corresponding to the image data based on the calculated time difference in the above-mentioned manner. That is to say, the time difference (Ts1−Tv1) is added to a specific time from the scan start reference signal generated by the reference signal generating unit 511 to the scan starting of the light beam corresponding to the image data at the "initial" stage, and when the calculated time has passed after the generation of the scan start reference signal, the emission of the light beam corresponding to the image data starts.

In addition, at that time, the scan adjusting unit 504 corrects the image length in the main scanning direction of the image (the latent image) formed on the photoconductor drum 141 based on the ratio (Ts0/Tv0) retained therein (step S1007). As described above, the correction of the image length is executed by changing the frequency of the clock signal inputted to the light source 301 for instructing the light emission time of the light beam corresponding to the image data so as to perform the scanning of the light beam corresponding to the image data in the scanning time shortened to (Ts0/Tv0) times, for example.

After that, when the light beam detecting unit 501 detects the light beam incident on the BD sensor 343 of the BD optical system of the scan end point, the calculation unit 503 calculates the above-mentioned time interval Tv0 based on the previous light beam detection time of the BD sensor 313 and the light beam detection time of the BD sensor 343 (step S1008). The calculation means 503 inputs the calculated time interval Tv0 to the scan adjusting unit 504. The scan adjusting unit 504 calculates the ratio (Ts0/Tv0) based on the inputted time interval Tv0 and the retained time interval Ts0 (step S1009).

The above-mentioned procedure is repeated until the emission of the entire light beams corresponding to the image data is completed. And after the emission of the entire light beams corresponding to the image data is completed, the procedure ends (step S1002, Yes).

As described above, in the multifunction peripheral 100, the correction is executed according to the time interval based on the light beam detection time of the optical sensor 402 in the light source without large change even if the temperature changes, so that it is possible to correct not only the magnification error in the main scanning direction on the photoconductor drum 141 but also the absolute position on the photoconductor drum 141 of the scan starting. As a result, the deterioration of picture quality of the image data caused by the temperature change can be controlled more definitely.

Moreover, since the optical sensor having the laser diode for adjusting the intensity of the light is used, any special sensor and reflective mirror are not required to be provided to the exposing device 143.

The above embodiment describes that the BD sensors were disposed respectively on the specific potion before the scan starting and the specific position after the scan end for the photoconductor drum 141, however the above-mentioned correction can be executed by using one of BD sensors. The following explanation relates to the correction method using the optical sensor 402 in the light source and one of the BD sensors.

Figure 11:
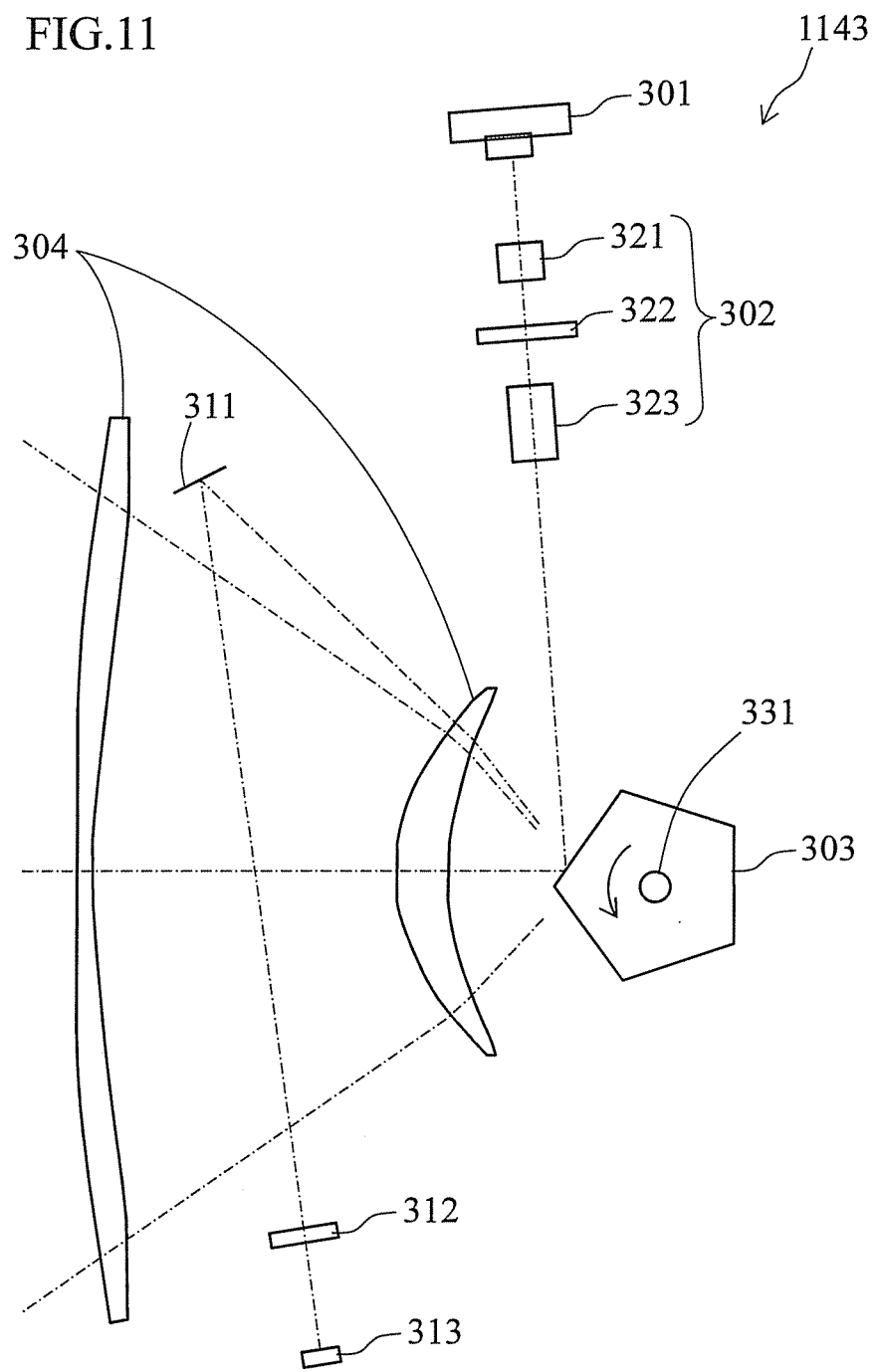
FIG. 11 is a schematic diagram showing another exposing device in accordance with an embodiment of the present disclosure.
Figure 12:
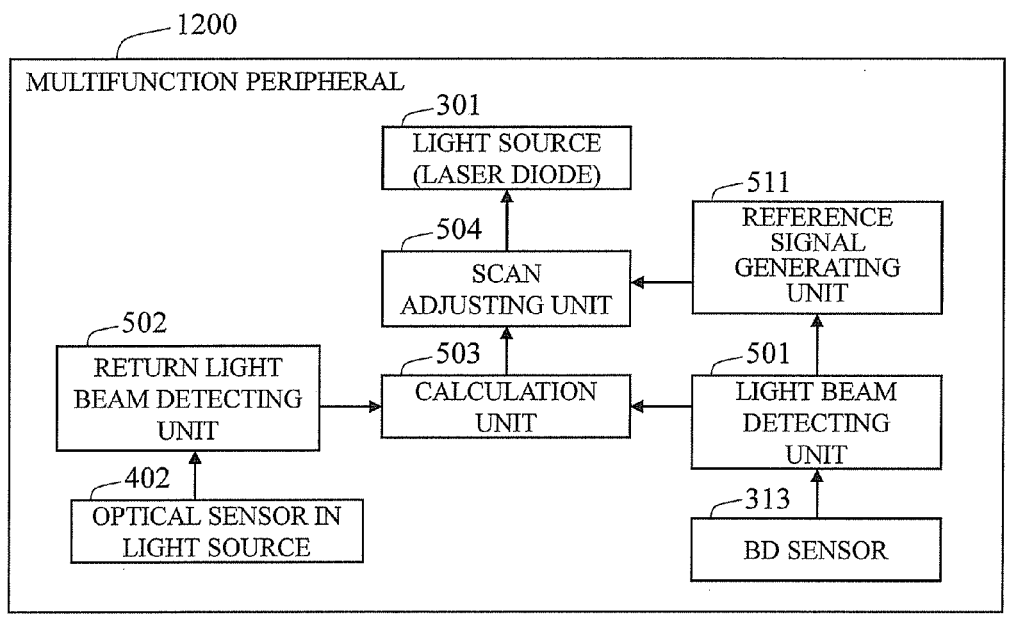
FIG. 12 is a functional block diagram showing another multifunction peripheral in accordance with an embodiment of the present disclosure.

FIG. 11 is a schematic diagram showing the other configuration of the exposing device. As shown in FIG. 11, the exposing device 1143 has no optical system of the scan end point side, which is a different structure from that of the exposing device 143 in FIG. 3. But the other components of the exposing device 1143 are the same as those of the exposing device 143 in FIG. 3. FIG. 12 is a functional block diagram of the multifunction peripheral having the exposing device. As shown in FIG. 12, the multifunction peripheral 1200 is different from the multifunction peripheral 100 in FIG. 5 in that the structure has no BD sensor 343. The other components of the multifunction peripheral 1200 are the same as those of the multifunction peripheral 100 in FIG. 5. Besides, in FIG. 11 and FIG. 12, the units providing with the same working effect as those already explained are imparted with the same references and the detailed explanation of those will be omitted hereinafter.

Figure 13:
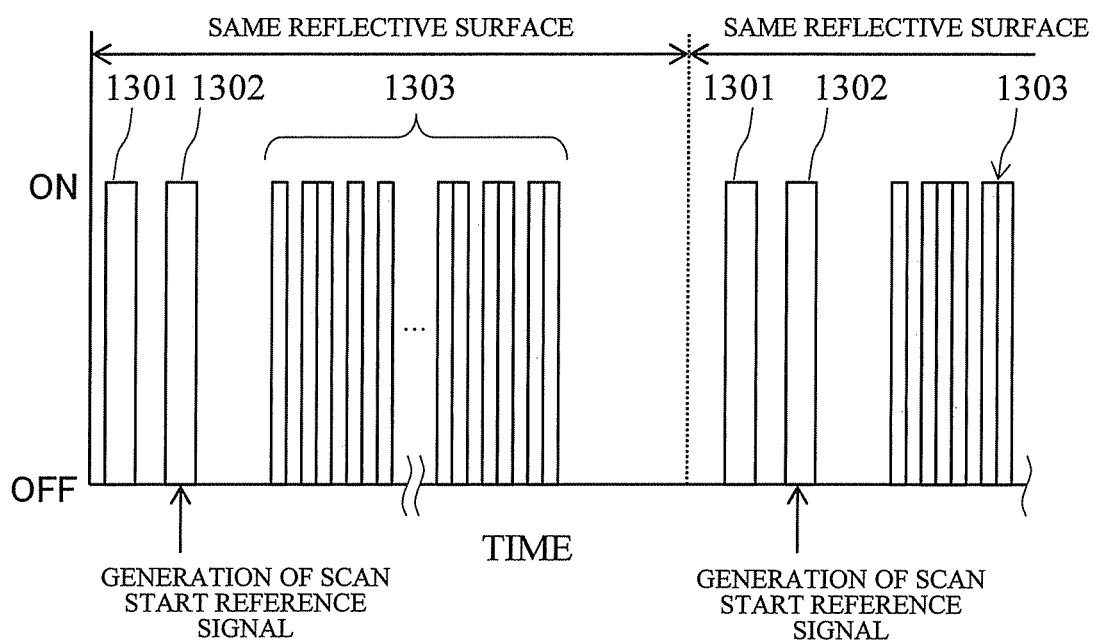
FIG. 13 is a time chart showing a state of ON/OFF of the light source of another exposing device in accordance with an embodiment of the present disclosure.

FIG. 13 is a time chart showing a state of ON (light)/OFF (light out) of the light source 301 included in the exposing device 1143. In FIG. 13, the horizontal axis corresponds to time, and the vertical axis corresponds to ON/OFF of the light source 301. As described in FIG. 13, the light source 301 starts emitting the light beam corresponding to the image data when the specific time passed after the generation of the scan start reference signal, like the exposing device 143 explained above. In FIG. 13, the emission of the light beam corresponding to the image data is expressed by a blinking group 1303. Besides, the emission of the light beam is carried out based on the clock signal adjusted by the scan adjusting unit 504.

A lighting 1302 shows the lighting of the light source 301 allowing the light beam to enter the BD sensor 313. The lighting 1302 is based on the scan start reference single and performed when the specific time corresponding to the number of rotations of rotary polyhedron 303 passed after the previous scan start reference signal. When the light beam detecting unit 501 detects that the light beam is incident on the BD sensor 313 during the lighting 1302, the reference signal generating unit 511 generates the scan start reference signal.

As shown in FIG. 13, the lighting 1301 of the light source 301 allowing the light beam to enter the optical sensor 402 in the light source is performed after the generation of the scan star reference signal and the ending of the blinking group 1303 and before the lighting 1302 allowing the light beam to enter the next BD sensor 313. The lighting 1301 is based on the previous scan start reference signal, but the light beams of the lighting 1302 and the blinking group 1303 following to the lighting 1301 are reflected by the same reflective surface. Besides, the intensity of the light beam, which is emitted from the light source 301 using the optical sensor 402 in the light source, is adjusted after the lighting 1301 of the light source 301 allowing the light beam to enter the optical sensor 402 in the light source and before the lighting 1302 allowing the light beam to enter the BD sensor 313.

Next, the operation principle of the exposing device 1143 is explained hereinafter. FIG. 14 is the diagram for explaining the method of correcting an image length in the main scanning direction in the multifunction peripheral 1200 having the exposing device 1143. FIG. 14A shows a detection result of the light beam detecting unit 501 and the return light beam detecting unit 502 at an initial stage when the temperature in the housing of the exposing device 1143 does not rise. FIG. 14B shows a detection result of the light beam detecting unit 501 and the return light beam detecting unit 502 at a stage after the temperature in the housing of the exposing device 1143 has risen. In FIG. 14A and FIG. 14B, a high level signal corresponds to a state of no incident light beam, and a low level signal corresponds to a state of the incident light beam. FIG. 14C is a schematic diagram showing the relation between the light beam detected position of the BD sensor 313 and the optical sensor 402 in the light source and the image length in the main scanning direction, regarding the initial stage and the stage after the temperature change.

In the exposing device 1143 in the embodiment, as shown in FIG. 14A, the light beam detecting unit 501 detects that the light beam reflected by the same reflective surface 332 is incident on the BD sensor 313 just before the scanning of the light beam corresponding to the image data starts. And then just before the detection, the return light beam detecting unit 502 detects that the light beam reflected by the same reflective surface 332 is incident on the optical sensor 402 in the light source. Under such status, the time interval between the light beam detection (a fall position) by the return beam detecting unit 502 and the light beam detection (a fall position) by the light beam detecting unit 501 is defined as Ts2.

When the temperature of the exposing device 1143 has risen, the scanning optical system expands with heat and the index of refraction changes, with the result that the detection time that the light beam detecting unit 501 detects the light beam incident on the BD sensor changes, as shown in FIG. 14B. According to the above-mentioned reasons, there is not a large change of the detection time that the return light beam detecting unit 502 detects the light beam incident on the optical sensor 402 in the light source. Under such status, the time interval between the light beam detection (a fall position) by the return light beam detecting unit 502 and the light beam detection (a fall position) by the light beam detecting unit 501 is defined as Tv2. In this example, the time interval Ts2>the time interval Tv2. In this case, regarding the length of the image formed by the light beams passing through the BD sensor 313, the image length at the stage after the temperature change (see "after the temperature change". FIG. 14C) becomes longer than the image length at the initial stage (see "initial", FIG. 14C).

As shown in FIG. 14C, at the stage after the temperature change, the position of the BD sensor 313 moved, but the position of the optical sensor 402 in the light source moved little. The scanning of the image data starts when the specific time passes after the light beam was detected by the BD sensor 313. Therefore, the scan starting point for the image at the stage "after the temperature change" moves from the scan starting point for the image at the "initial" stage for the amount same as the position moving amount of the BD sensor 313. In this structure, the position moving amount of the BD sensor 313 is a distance corresponding to a time difference (Ts2−Tv2). As a result, as understood by FIG. 14C, the scanning starts of the light beam corresponding to the image data when the specific time and the time difference (Ts2−Tv2) passed after the light beam detection of the BD sensor 313, so that the scan starting point for the image can be corrected to the scan starting point of the image at the "initial" stage (see the "(corrected) after the temperature change" in FIG. 14C). That is to say, the absolute position of the scan starting point of the image can be corrected.

When the scanning optical system 304 and the housing are configured uniformly and the temperature of the scanning optical system 304 changes evenly, the heat expansion of the scanning optical system 304 and the housing due to the temperature change is considered to be proportional to the moving amount of the BD sensor 313, that is to say, proportional to the moving amount corresponding to the time difference (Ts2−Tv2), to some extent. In this case, the index of refraction of the scanning optical system 304 is also considered to change evenly as a whole. Therefore, it is possible to assume that the change of the image length in the main scanning direction of the scanning optical system 304 due to the temperature change occurs in proportion to the moving amount corresponding to the time difference (Ts2−Tv2). Specifically, the image length in the main scanning direction after the temperature change is thought to be $\{1+(Ts2-Tv2)\times\alpha\}$ times ($\alpha$: constant) as much as the image length in the main scanning direction at the initial stage. Accordingly, the scanning of the light beam corresponding to the image data is performed in the time shorten to $\{1+(Ts2-Tv2)\times\alpha\}$ times, so that the image length in the main scanning direction can be corrected. The coefficient $\alpha$ has been found in advance experimentally.

In particular, when the expansion of the scanning optical system 304 and the housing due to the temperature change occurs symmetrically to an optical target line (a line passing a center of the upward direction and the downward direction of the drawing, in respect of the scanning optical system 304 in FIG. 11). When the change of the index of refraction of the scanning optical system 304 also occurs uniformly, the image length in the main scanning direction after the temperature change becomes {1+(Ts2−Tv2)×2} times as much as the image length in the main scanning direction at the initial stage. Therefore, in this case, the scanning of the light beam corresponding to the image data is performed in the scanning time shortened to {(Ts2−Tv2)×2} times, and the image length in the main scanning direction can be corrected.

In the embodiment, the time interval Ts2 and Tv2 are calculated by the calculation unit 503. The scan adjusting unit 504 calculates a difference (Ts2−Tv2) between the time interval Tv2 and the time interval Ts2, and adjusts the luminescence time of the light source 301 for scanning the light beam corresponding to the image data based on the calculated difference and the recorded coefficient α.

Figure 15:
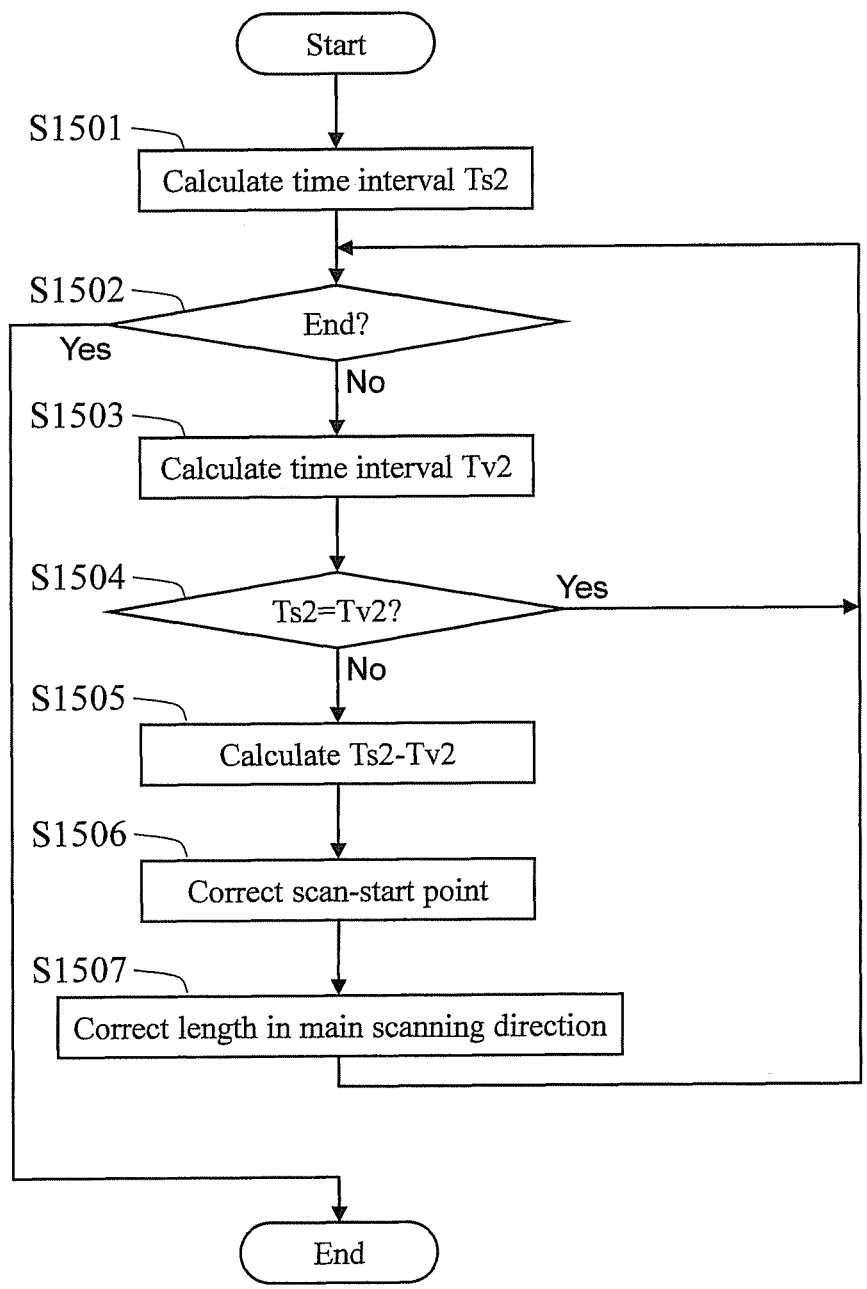
FIG. 15 is a flowchart showing an example of correction procedure performed by the other multifunction peripheral in accordance with an embodiment of the present disclosure.

FIG. 15 is a flowchart showing an example of the correction procedure of the image position and the image length in the main scanning direction at the light beam scanning corresponding to the image data in the multifunction peripheral 1200. The start of the procedure is triggered by a state that the exposing operation can be performed after the exposing device 1143 is activated for forming a latent image and the number of rotations of the rotary polyhedron 303 is stabilized.

When the procedure starts, at the beginning, the return light beam detecting unit 502 detects the light beam incident on the optical sensor 402 in the light source, and then the light beam detecting unit 501 detects the light beam incident on the BD sensor 313. At this time, the calculation unit 503 calculates the time interval Ts2 based on the light beam detection time of the BD sensor 313 and the light beam detection time of the optical sensor 402 in the light source (Step S1501). The calculation unit 503 inputs the calculated time interval Ts2 to the scan adjusting unit 504. The scan adjusting unit 504 retains the inputted time interval Ts2.

After that, along with the rotation of the rotary polyhedron 303, the return light beam detecting unit 502 detects the light beam incident on the optical sensor 402 in the light source, and then the light beam detecting unit 501 detects the light beam incident on the BD sensor 313. At this time, the calculation unit 503 calculates the time interval Tv2 based on the light beam detection time of the BD sensor 313 and the light beam detection time of the optical sensor 402 in the light source (Step S1502, No, S1503). The calculation unit 503 inputs the calculated time interval Tv2 to the scan adjusting unit 504. The scan adjusting unit 504 determines whether or not the inputted time interval Tv2 and the retained time interval Ts2 are the same (Step S1504). Besides, the meaning of "the same" includes not only that they coincide perfectly with each other, but that they can be considered as being equal to each other. The range to consider as being equal can be specified in the scan adjusting unit 504 in advance. When it is determined that the time interval Tv2 and the time interval Ts2 are the same, the scan adjusting unit does not execute the correction (Step S1504, Yes).

When the emission of the entire light beams corresponding to the image data is not completed, along with the rotation of the rotary polyhedron 303, the return light beam detecting unit 502 detects the light beam incident on the optical sensor 402 in the light source, and subsequently, the light beam detecting unit 501 detects the light beam incident on the BD sensor 313. At this time, the calculation unit 503 recalculates the time interval Tv2 based on the above-mentioned detection times, and the calculated time interval Tv2 is inputted to the scan adjusting unit 504 (step S1502, No, S1503).

When the temperature of the exposing device 1143 has risen, it occurs that the scanning optical system 304 expands with heat and the index of refraction changes, with the result that the time interval Tv2 calculated by the calculation unit 503 change gradually. Therefore, when the change becomes larger, the adjusting unit 504 determines that the inputted time interval Tv2 and the retained time interval Ts2 are not the same (step S1504, No). When it is determined that the time interval Tv2 and the time interval Ts2 are not the same, the scan adjusting unit 504 calculates the difference (Ts2−Tv2) between the time interval Tv2 inputted by the calculation unit 503 and the time interval Ts2 retained therein (step S1505).

The scan adjusting unit 504 that has calculated the time difference (Ts2−Tv2) corrects the scan starting point of the light beam corresponding to the image data based on the time difference calculated as above (step S1506). That is to say, the time difference (Ts2−Tv2) is added with the specific time from the scan start reference signal generated by the reference signal generating unit 511 to the scanning start of the light beam corresponding to the image data at the "initial" stage, and when the added time has passed after the generation of the scan start reference signal, the emission of the light beam corresponding to the image data starts.

In addition, the scan adjusting unit 504 corrects the image length in the main scanning direction of the image (the latent image) formed on the photoconductor drum 141 based on the calculated time difference and the recorded constant α in the manner as described above (step S1507). As described above, the correction of the image length can be executed by changing the frequency of the clock signal inputted to the light source 301 in order to instruct the light emission time of the light beam corresponding to the image data so as to perform the scanning of the light beam corresponding to the image data in the scanning time shortened to (Ts2−Tv2)×α times.

The above-mentioned procedure is repeated, until the emission of the entire light beams corresponding to the image data is completed. And after the emission of the entire light beams corresponding to the image data is completed, the procedure is finished (step S1502, Yes).

A described above, in the multifunction peripheral 1200, since the correction is executed based on the time interval depending on the light beam detection time of the optical sensor 402 in the light source that does not change greatly even if the temperature changes, it is possible to correct not only the magnification error in the main scanning direction on the photoconductor drum 141, but also the absolute position of the scan starting on the photoconductor drum 141. As a result, the deterioration of the picture quality caused by the temperature change can be controlled more reliably.

In addition, under this configuration, there is no need that the BD sensors are disposed respectively at the specific position before the san starting and at a specific position after the scan end for the photoconductor drum like the conventional method. The BD sensor to be disposed in the exposing device 1143 may be only one. Therefore, the number of components can be reduced, and the apparatus can be materialized at lower cost.

Figure 16:
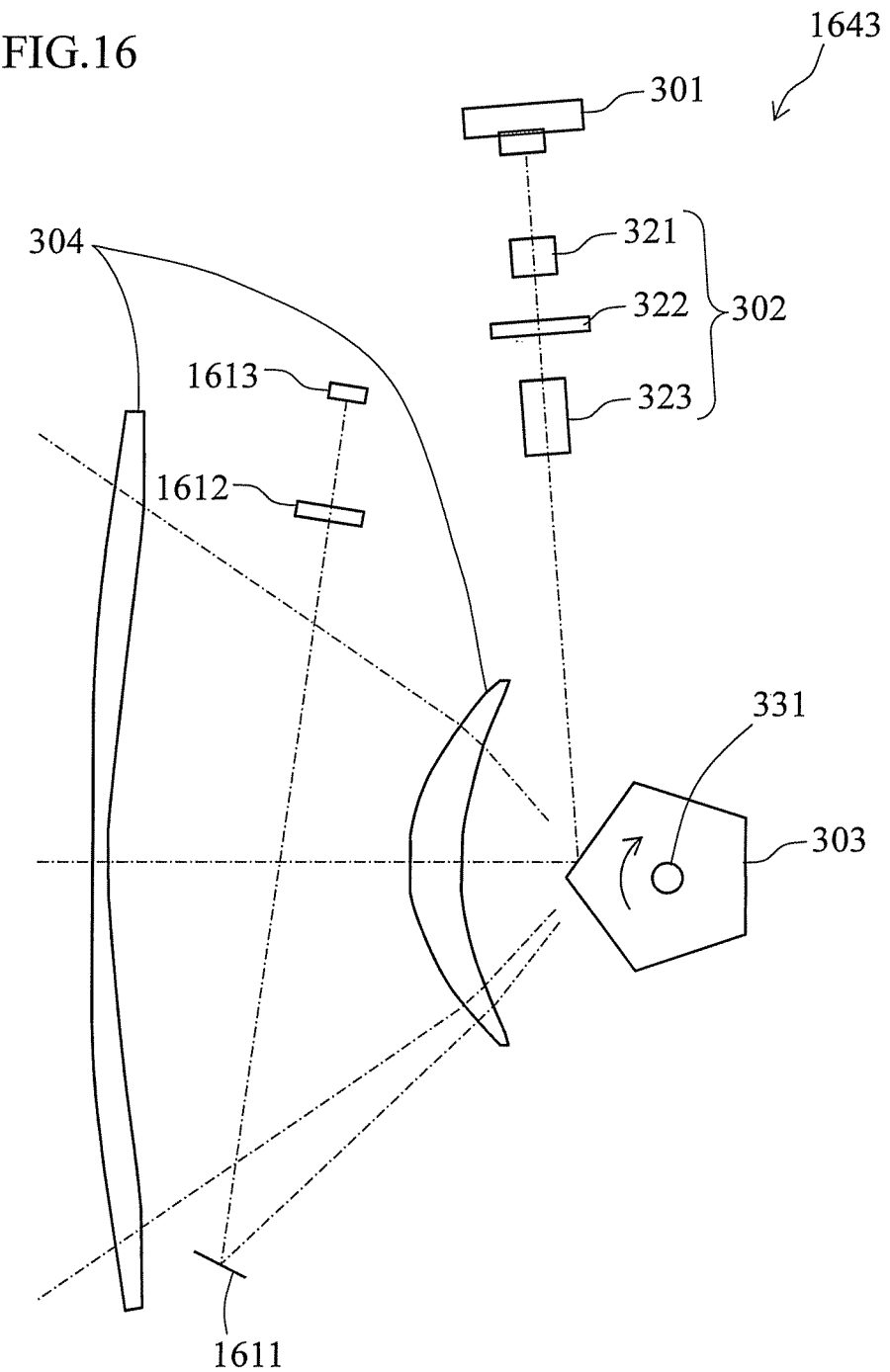
FIG. 16 is a schematic diagram showing the other exposing device in accordance with an embodiment of the present disclosure.
Figure 17:
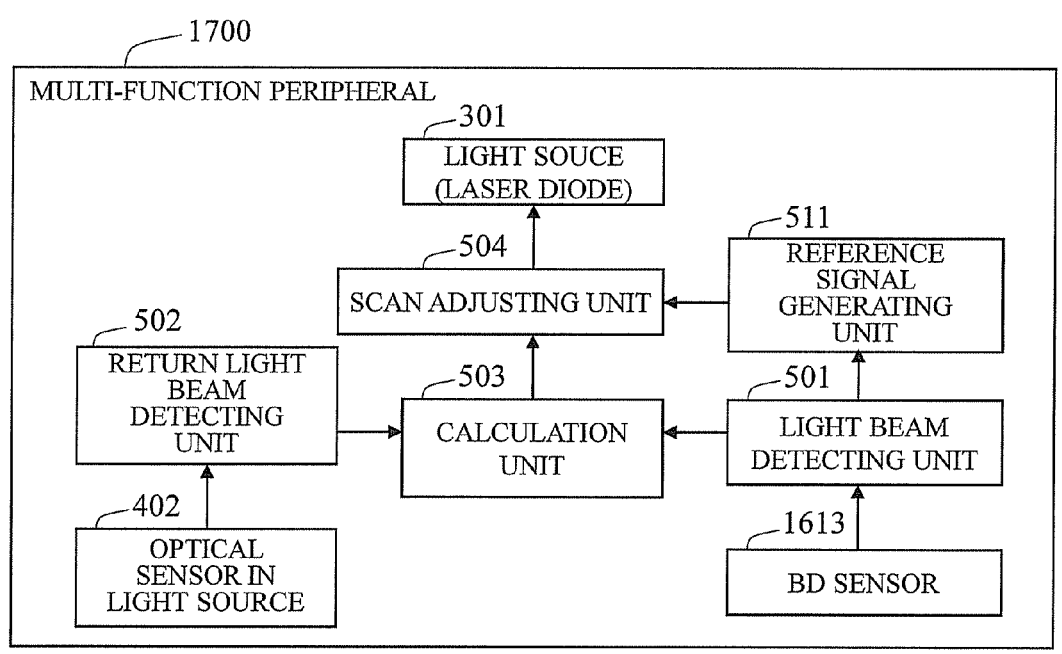
FIG. 17 is a functional block diagram showing the other multifunction peripheral in accordance with an embodiment of the present disclosure.

FIG. 16 is a schematic diagram showing the other configuration of the exposing device. As shown in FIG. 16, the exposing device 1643 has a different structure from the exposing device 143 in FIG. 3, wherein the rotation direction of the rotary polyhedron 303 is inverse and the BD optical system of the scan starting point side is disposed at the different position due to the reverse rotation direction. The other components in the exposing device 1643 are the same as those of the exposing device 143 in FIG. 3. Besides, in the exposing device 1643, the BD optical system of the scan starting point side includes the return mirror 1611, the cylindrical lens 1612, and the BD sensor 1613, like the exposing device 143 in FIG. 3. FIG. 17 is a functional block diagram of the multifunction peripheral having the exposing device. As shown in FIG. 17, in the multifunction peripheral 1700, the light beam detecting unit 501 detects based on the output of the BD sensor 1613 that the light beam deflected by the reflective surface of the rotary polyhedron 303 is incident on the BD sensor 1613, instead of the BD sensor 313, which is a different structure from the multifunction peripheral 1200 in FIG. 15. The other components are the same as those of the multifunction peripheral 1200. In FIG. 16 and FIG. 17, the units providing with the same working effect as those already explained are imparted with the same references, and the detailed explanation is omitted.

Figure 18A:
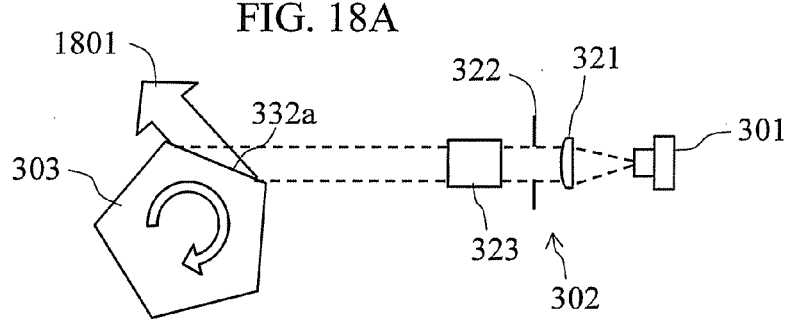
FIGS. 18A and 18B are schematic diagrams showing the operation of the other exposing device in accordance with an embodiment of the present disclosure.
Figure 18B:
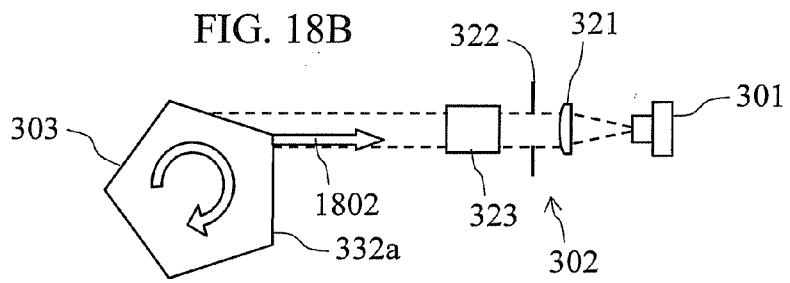

FIGS. 18A and 18B are schematic diagrams showing the operation of the exposing device 1643. FIG. 18A corresponds to a state that the light beam reflected by the reflective surface 332a is incident on the BD sensor 1613, and FIG. 18B corresponds to a state that the light beam reflected by the reflective surface 332a is incident on the optical sensor 402 in the light source. Besides, in FIG. 18A and FIG. 18B, the arrow labeled to the rotary polyhedron 303 shows the rotation driving direction of the rotary polyhedron 303.

As understood from FIG. 18A and FIG. 18B, one reflective surfaces 332a constituting the rotary polyhedron 303 becomes the state shown in FIG. 18A and the state shown in FIG. 18B in order according to the rotation of the rotary polyhedron 303.

In the stat shown in FIG. 18A, the light beam that was emitted from the light source 301 and passed through the incident optical system 302 is reflected by the reflective surface 332a. The reflected light beam 1801 is incident on the BD optical system of the scan starting point side. That is to say, the light beam 1801 is incident on the BD sensor 1613.

Additionally, in the state shown in FIG. 18B, the light beam that was emitted from the light source 301 and passed through the incident optical system 302 is reflected at a back end of the rotational direction of the reflective surface 332a. The reflected light beam 1802 passes through the incident optical system 302, and then is incident on the light source 301. That is to say, the light beam 1802 is incident on the optical sensor 402 in the light source. Besides, the relations shown in FIG. 18A and FIG. 18B are established regarding the respective reflective surface 332 constituting the rotary polyhedron 303, too.

Figure 19:
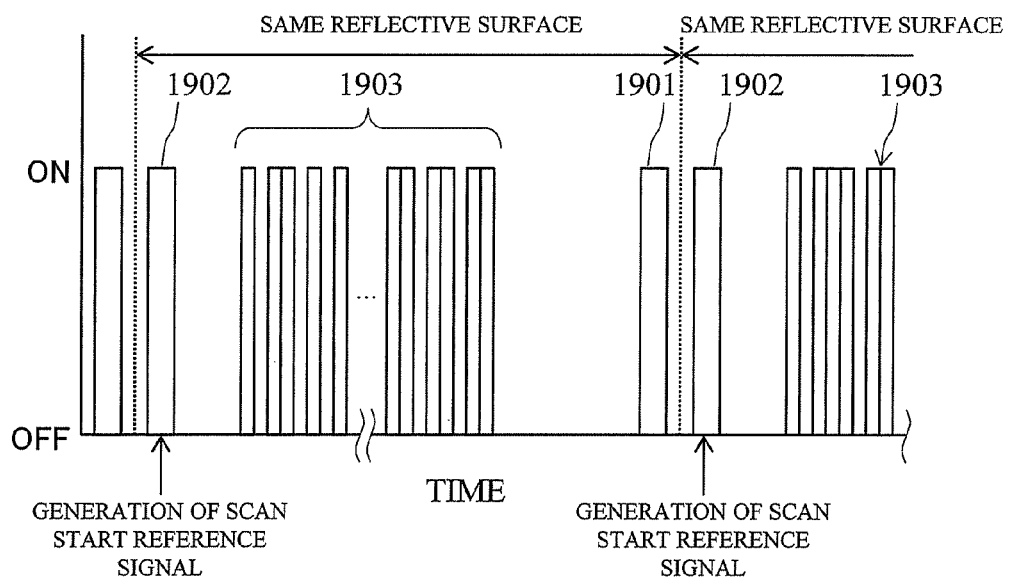
FIG. 19 is a time chart showing a state of ON/OFF of the light source of the other exposing device in accordance with an embodiment of the present disclosure.

As shown in FIG. 18B, in order to allow the light beam reflected by the rotary polyhedron 303 to enter the optical sensor 402 in the light source, it is necessary to light the light source 301 when each reflective surface 332 of the rotary polyhedron 303 is nearly perpendicular to the optical axis of the light beam. Therefore, it is configured in the embodiment no as to light the light source 301 around the perpendicular state described above, based on the scan start reference signal generated by the reference signal generating unit 511. FIG. 19 is a time chart showing a state of ON (light)/OFF (light out) of the light source 301. In FIG. 19, a horizontal axis corresponds to time, and a vertical axis corresponds to ON/OFF of the light source 301.

As shown in FIG. 19, the light source 301 starts emitting the light beam corresponding to the image data when the specific time passed after the scan start reference signal, in the same manner as the exposing device 143 and 1143 described above. In FIG. 19, the emission of the light beam corresponding to the image data is expressed by a blinking group 1903. Besides, the emission of the light beam corresponding to the image data is carried out according to the clock signal adjusted by the scan adjusting unit 504.

A lighting 1902 shows the lighting of the light source 301 in order to allow the light beam to enter the BD sensor 1613. The lighting 1902 is performed based on the previous scan start reference single when the specific time corresponding to the number of rotations of rotary polyhedron 303 has passed after the previous scan start reference signal. When the light beam detecting unit 501 detects the light beam that is incident on the BD sensor 313 during the lighting 1902, the reference signal generating unit 511 generates the scan start reference signal.

As shown in FIG. 19, the lighting 1901 of the light source 301 for allowing the light beam to enter the optical sensor 402 in the light source is performed at the end of the blinking group 1903 after the scan star reference signal is generated and before the lighting 1902 for allowing the light beam to enter the next BD sensor 1613. The blinking group 1903 following to the lighting 1902 and the lighting 1901 and shows that the light beams are reflected by the same reflective surface, as understood from FIG. 18A and FIG. 18B. In the embodiment, the adjusting of the intensity of the light beam emitted from the light source 301 using the optical sensor 402 in the light source is carried out before the lighting 1902 for allowing the light beam to enter the BD sensor 1613 that is executed immediately after the lighting 1901 of the light source 301 for allowing the light beam to enter the optical sensor 402 in the light source.

Figure 20A:
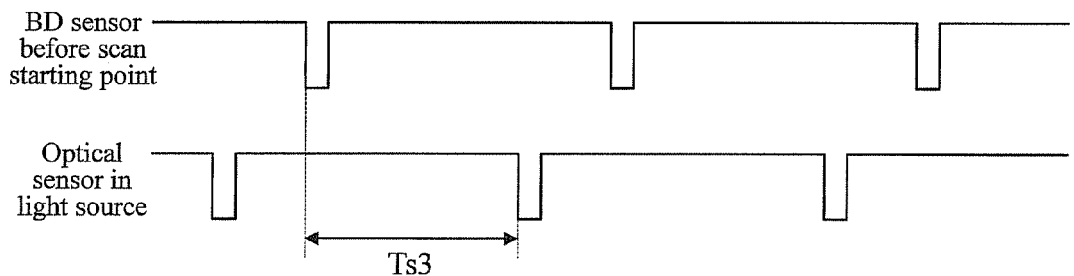
FIG. 20A, FIG. 20B, and FIG. 20C are diagrams showing the operation principles of the other multifunction peripheral in accordance with an embodiment of the present disclosure.
Figure 20B:
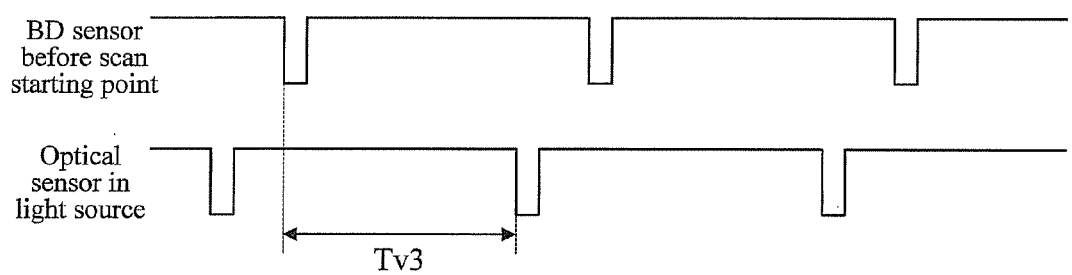
Figure 20C:
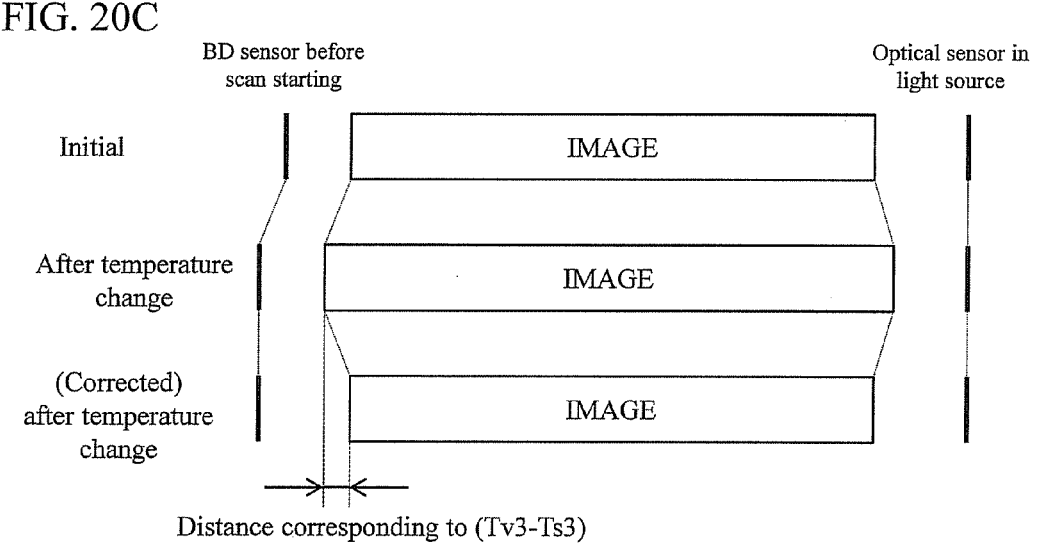

Next, the operation principles of the exposing device 1643 are explained hereinafter. FIG. 20 is the diagram for explaining the method of correcting an image length in the main scanning direction in the multifunction peripheral 1700 having the exposing device 1643. FIG. 20A shows a detection result of the light beam detecting unit 501 and the return light beam detecting unit 502 at an initial stage, when the temperature in the housing of the exposing device does not rise. FIG. 20B shows a detection result of the light beam detecting unit 501 and the return light beam detecting unit 502 at a stage after the temperature in the housing of the exposing device 1643 has risen. In FIG. 20A and FIG. 20B, a high level signal corresponds to a state of no incident light beam, and a low level signal corresponds to a state that the incident the light beam exists. FIG. 20C is a diagram schematically illustrating a relation between a detected positions of the light beam by BD sensor 1613 and the optical sensor 402 in the light source and an image length in the main scanning direction regarding the initial stage and the stage after the temperature change.

In the exposing device 1643 in the embodiment, as shown in FIG. 20A, the light beam detecting unit 501 detects the light beam the reflected by the same reflective surface 332a is incident on the BD sensor 1613, just before the scan starting of the light beam corresponding to the image data. And after the scanning of the light beam corresponding to the image data, the return light beam detecting unit 502 detects the light beam reflected by the same reflective surface 332a is incident on the optical sensor 402 in the light source. Under such state, the time interval between the light beam detection (the fall position) of the light beam detecting unit 501 and the light beam detection (the fall position) of the return light beam detecting unit 502 is defined as Ts3.

When the temperature of the exposing device 1643 has risen, the scanning optical system expands with heat and the index of refraction changes, with the result that the light beam detection time that the light beam detecting unit 501 detects the light beam incident on the BD sensor 1613 changes, as shown in FIG. 20B. Because of the above-mentioned reasons, however, there is not large change of the detection time that the return light beam detecting unit 502 detects the light beam incident on the optical sensor 402 in the light source. Under such status, the time interval between the light beam detection (a fall position) by the light beam detecting unit 501 and the light beam detection (a fall position) by the return light beam detecting unit 502 is defined as Tv3. In this example, the time interval Tv3>the time interval Ts3. In this case, regarding the length in the main scanning direction of the image data formed by the light beams passing through the BD sensor 1613, the image length at the stage after the temperature change (see "after the temperature change" in FIG. 20C) becomes longer than that at the initial stage (see "initial" in FIG. 20C).

As shown in FIG. 20C, at the stage after the temperature change, the position of the BD sensor 1613 moved, but the position of the optical sensor 402 in the light source did not move little. The scanning of the image data starts when the specific time passes after the light beam was detected by the BD sensor 1613. Therefore, the scan starting point for the image at the stage "after the temperature change" moves from the scan starting point of the image at the "initial" stage for the amount same as the moving amount of the position of the BD sensor 313. In this structure, the position moving amount of the BD sensor 1613 is a distance corresponding to a time difference (Tv3−Ts3). As understood by FIG. 20C, the scanning starts of the light beam corresponding to the image data when the specific time and the time difference (Tv3−Ts3) passes after detecting the light beam incident on the BD sensor 1613, so that the scan starting point of the image can be corrected to the scan starting point of the image at the "initial" stage (see the stage "(corrected) after the temperature change" in FIG. 20C). That is to say, the absolute position of the scan starting point of the image can be corrected.

As understood from FIG. 20A and FIG. 20B, the image length in the main scanning direction can be corrected by performing the scanning of the light beam corresponding to the image data in the scanning time shortened to (Ts3/Tv3) times.

In the embodiment, the time interval Ts3 and Tv3 are calculated by the calculation unit 503. The scan adjusting unit 504 calculates a difference (Ts3−Tv3) between the time interval Tv3 and the time interval Ts3 and a ratio of the time interval Ts3 and the time interval Tv3, and then adjusts the luminescence time of the light source 301 for the light beam scanning corresponding to the image data based on the calculated difference and the ratio.

Figure 21:
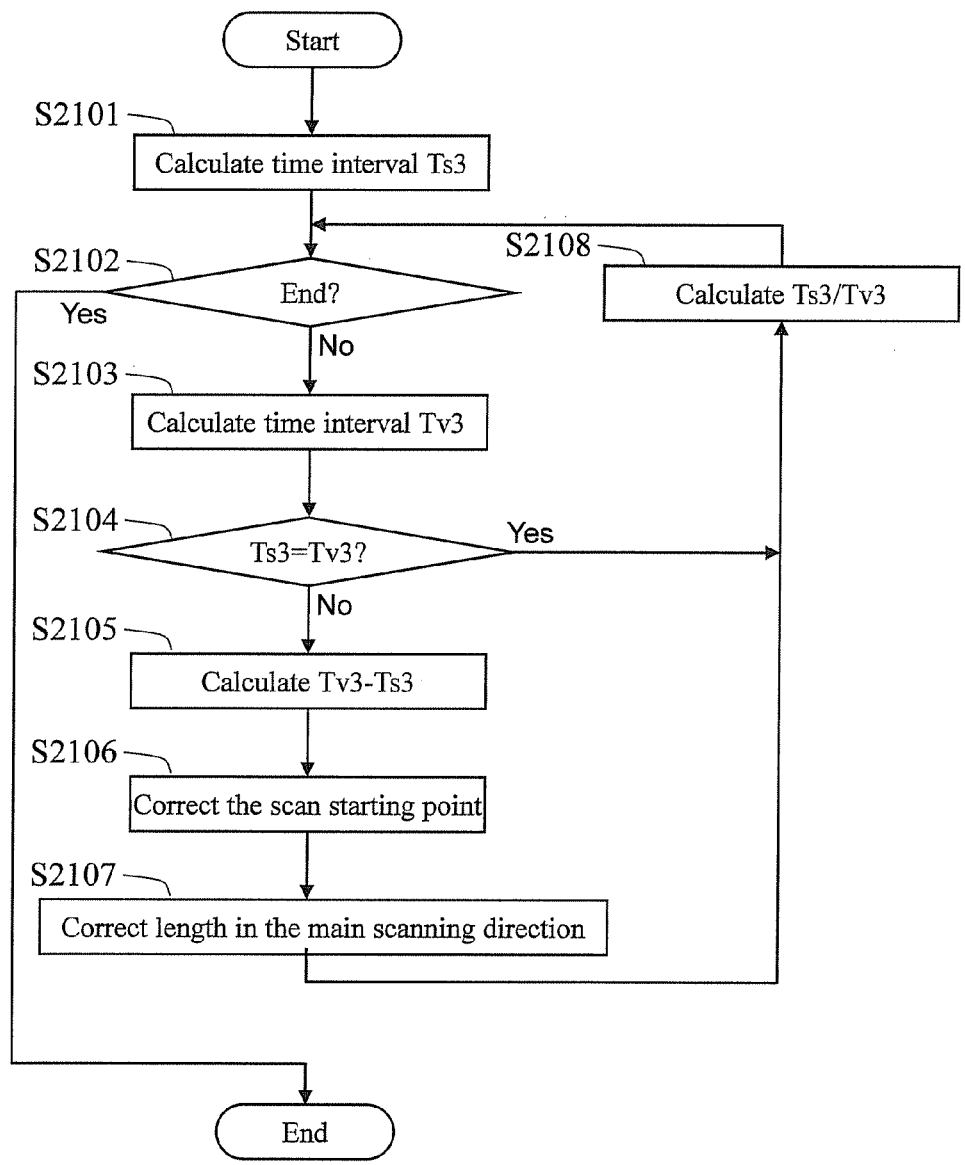
FIG. 21 is a flowchart showing an example of correction procedure performed by the other multifunction peripheral in accordance with an embodiment of the present disclosure.

FIG. 21 is a flowchart showing an example of the correction procedure of the image position and the image length in the main scanning direction at the light beam scanning corresponding to the image data in the multifunction peripheral 1700. The start of the procedure is triggered by a state that the exposing operation can be performed after the exposing device 1643 is activated for forming a latent image and the number of rotations of the rotary polyhedron 303 is stabilized.

When the procedure starts, at the beginning, the light beam detecting unit 501 detects the light beam incident on the BD sensor 1613, and then the return light beam detecting unit 502 detects the light beam incident on the optical sensor 402 in the light source. At this time, the calculation unit 503 calculates the time interval Ts3 based on the light beam detection time of the optical sensor 402 in the light source and the light beam detection time of the BD sensor 313 and (Step S2101). The calculation unit 503 inputs the calculated time interval Ts3 to the scan adjusting unit 504. The scan adjusting unit 504 retains the inputted time interval Ts3.

After that, along with the rotation of the rotary polyhedron 303, the light beam detecting unit 501 detects the light beam incident on the BD sensor 1613, and then the return light beam detecting unit 502 detects the light beam incident on the optical sensor 402 in the light source. At this time, the calculation unit 503 calculates the time interval Tv3 based on the light beam detection time of the optical sensor 402 in the light source and the light beam detection time of the BD sensor 1613 (Step S2102, No, S2103). The calculation unit 503 inputs the calculated time interval Tv3 to the scan adjusting unit 504. The scan adjusting unit 504 determines whether or not the inputted time interval Tv3 and the retained time interval Ts3 are the same (Step S2104). Besides, the meaning of "the same" includes not only that they coincide perfectly with each other, but that they can be considered as being equal to each other. The range to consider as being equal can be set to the scan adjusting unit in advance. When it is determined that the time interval Tv3 and the time interval Ts3 are the same, the scan adjusting unit 504 does not execute the correction (Step S2104, Yes). In addition, at this time, the calculation unit 503 calculates the ratio (Tv3/Ts3) based on the inputted time interval Tv3 and the retained time interval Ts3, and then retains the value of the ratio (Step S2108).

When the emission of the entire light beams corresponding to the image data is not completed, the light beam detecting unit 501 detects the light beam incident on the BD sensor 313 along with the rotation of the rotary polyhedron 303, and subsequently, the return light beam detecting unit 502 detects the light beam incident on the optical sensor 402 in the light source. At this time, the calculation unit 503 recalculates the time interval Tv3 based on the above-mentioned detection times, and the calculated time interval Tv3 is inputted to the scan adjusting unit 504 (step S2102, No, S2103).

When the temperature of the exposing device 1643 rises, the scanning optical unit 304 expands with heat and the index of refraction is changing, the time interval Tv3 calculated by the calculation unit 503 changes gradually. Therefore, when the change becomes large, the adjusting unit 504 determines that the inputted time interval Tv3 and the retained time interval Ts3 are not the same (step S2104, No). When it is determined that the time interval Tv3 and the time interval Ts3 are not the same, the scan adjusting unit 504 calculates the difference (Ts3−Tv3) between the time interval Tv3 inputted by the calculation unit 503 and the time interval Ts3 retained therein (step S2105).

The scan adjusting unit 504 that has calculated the time difference (Tv3−Ts3) corrects the scan starting point of the light beam corresponding to the image data based on the calculated time difference as described above (step S2106). That is to say, the time difference (Tv3−Ts3) is added to the specific time from the scan start reference signal generated by the reference signal generating unit 511 at the "initial" stage to the start of scanning of the light beam corresponding to the image data, and the emission of the light beam corresponding to the image data starts when the added time has passed after the generation of the scan start reference signal.

In addition, the scan adjusting unit 504 corrects the image length in the main scanning direction of the image (the latent image) formed on the photoconductor drum 141 based on the ratio (Ts3/Tv3) retained therein (step S2107). As described above, the correction of the image length is executed by changing the frequency of the clock signal inputted to the light source 301 for instructing the light emission time of the light beam corresponding to the image data so as to perform the scanning of the light beam corresponding to the image data in the scanning time shortened to (Ts3/Tv3) times.

The above-mentioned procedure is repeated by the completion of the emission of the entire light beams corresponding to the image data. And after completion of the emission of the entire light beams corresponding to the image data, the procedure ends (step S2102, Yes).

As described above, in the multifunction peripheral 1700, the correction is executed according to the time interval based on the light beam detection time of the optical sensor 402 in the light source without large change even if the temperature changes. Therefore, not only the magnification error in the main scanning direction on the photoconductor drum 141 but also the absolute position of the scan start on the photoconductor drum 141 can be corrected. As a result, the deterioration of picture quality of the image data caused by the temperature change can be controlled more reliably.

In addition, under this configuration, it is not necessary that the BD sensors are disposed respectively at the specific position before the scan starting and at a specific position after the scan end on the photoconductor drum 141 like the conventional method. The BD sensor to be disposed in the exposing device 1643 may be only one. Therefore, it is possible to reduce the number of components, and the cost reduction can be materialized.

As described above, in the present disclosure, it is possible to correct the absolute position in the main scanning direction, and control the deterioration of the picture quality of the image caused by the temperature change. For instance, the precision of the color shift can be improved at the multicolor printing, and the position aberration of writing out the image and the difference of the image length can be reduced at the duplex printing. Under this configuration, the correction is executed for all the reflective surfaces constituting the rotary polyhedron 303 based on the time intervals Ts0, Ts1, Ts2, and Ts3 calculated for the specific reflective surfaces consisting the rotary polyhedron 303, so that it is also possible to correct the magnification error in the main scanning direction and the position aberration of writing out the image that are caused by individual differences of each reflective surface such as a hollows or a projection throughout the reflective surface.

Besides, the embodiments described above do not limit the technical range of the present disclosure. In addition to the foregoing embodiments, it is possible to carry out various modifications and applications within the range of the present disclosure. For instance, the correction of the image length in the main scanning direction is executed by shortening the scanning time of the light beam corresponding to the image data for (Ts2−Tv2)×α in the examples shown in FIG. 11 and FIG. 12, but the correction method shown in FIG. 16 and FIG. 17 may be used. That is to say, it may be configured so as to obtain the detection cycle Td that the return beam detecting unit 502 detects the light beam incident on the optical sensor 402 in the light source, and then calculate the ratio {(Td−Ts2)/(Td−Tv2)}, whereby the image length in the main scanning direction is corrected by shortening the scanning time of the light beam corresponding to the image data to {(Td−Ts2)/(Td−Tv2)} times.

Likewise, the correction method used in the example shown in FIG. 11 and FIG. 12 may be applied to the example shown in FIG. 16 and FIG. 17. That is to say, it may be configured so as to obtain the detection cycle Td that the return beam detecting unit 502 detects the light beam incident on the optical sensor 402 in the light source, and then calculate the time difference (Td−Ts3) and (Td−Tv3), whereby the image length in the main scanning direction is corrected by shortening the scanning time of the light beam corresponding to the image data to {(Td−Ts3)−(Td−Tv3)}×α=(Tv3−Ts3)×α.

In the example shown in FIG. 11 and FIG. 12, it is configured that the BD sensor and the optical sensor in the light source are disposed so that the light beam deflected by the same reflective surface constituting the rotary polyhedron is incident on the both sensors before the start of scanning the deflected light beam on the surface to be scanned, but the both sensors may be disposed so that the light beam deflected by the same reflective surface constituting the rotary polyhedron is incident on the both sensors after the end of scanning the deflected light beam on the surface to be scanned.

In the example shown in FIG. 16 and FIG. 17, it is configured that the BD sensor and the optical sensor in the light source are disposed so that the light beam deflected by the same reflective surface constituting the rotary polyhedron is incident on the BD sensor before the start of scanning the deflected light beam on the surface to be scanned, and the light beam deflected by the reflective surface is incident on the optical sensor in the light source after the end of scanning the deflected light beam on the surface to be scanned, however, it may be configured that the both sensors are disposed so that the light beam deflected by the same reflective surface constituting the rotary polyhedron is incident on the optical sensor in the light source before the start of scanning the deflected light beam on the surface to be scanned and the light beam deflected on the reflective surface is incident on the BD sensor after the end of scanning the deflected light beam on the surface to be scanned.

Regarding the flowcharts shown in FIG. 10, FIG. 15 and FIG. 21, the order of each steps can be changed freely within the range that can provide with the equivalent action. For instance, the detection time of the end can be carried out at an arbitrary position.

In addition, in the abovementioned embodiments, the present disclosure was materialized as the multifunction peripheral, but the present disclosure can be applied to not only the digital multifunction peripheral but also an arbitrary image forming apparatus like the printer, and the copying machine. Moreover, the present disclosure can be applied to an arbitrary scanning optical apparatus including the rotary polyhedron.

What is claimed is:

1. A scanning optical apparatus comprising:
   a light source;
   a rotary polyhedron that has reflective surfaces for reflecting a light beam emitted from the light source, deflects the light beam emitted from the light source by moving the reflective surfaces, and scans the light beam on a surface to be scanned in a main scanning direction;
   a Beam Detect sensor to enter the light beam reflected by the reflective surface constituting the rotary polyhedron thereto;
   a light beam detecting unit for detecting, based on an output of the Beam Detect sensor, the light beam reflected by the reflective surface that is incident on the Beam Detect sensor;
   an optical sensor in the light source that is disposed on an optical axis of the light beam and on a side opposite to the light beam emitting side, on which the light beam reflected by the reflective surface is incident, and detects the intensity of the incident light beam;
   a return light beam detecting unit for detecting, based on an output of the optical sensor in the light source, the light beam reflected by the reflective surface that is incident on the optical sensor in the light source;
   a calculation unit for calculating a time interval between the time when the light beam detecting unit detects the light beam incident on the Beam Detect sensor and the time when the return light beam detecting unit detects the light beam incident on the optical sensor in the light source; and a scan adjusting unit for adjusting a luminescence time of the light source for scanning the light beam on the surface to be scanned, based on the time interval calculated by the calculation unit.

2. The scanning optical apparatus according to claim 1, wherein the Beam Detect sensor is one, and the Beam Detect sensor and the optical sensor in the light source are disposed so that the light beam reflected by a same reflective surface constituting the rotary polyhedron is incident on both sensors before the start of scanning the reflected light beam on the surface to be scanned or after the end of scanning the reflected light beam on the surface to be scanned.

3. The scanning optical apparatus according to claim 1, wherein the Beam Detect sensor is one, and the Beam Detect sensor and the optical sensor in the light source are disposed so that the light beam reflected by a same reflective surface constituting the rotary polyhedron is incident on one sensor before the start of scanning the reflected light beam on the surface to be scanned, and the light beam reflected by the reflective surface is incident on the other sensor after the end of scanning the reflected light beam on the surface to be scanned.

4. The scanning optical apparatus according to claim 1, wherein the scan adjusting unit adjusts a time at the start of scanning the light beam on the surface to be scanned based on the time interval calculated by the calculation unit before the temperature change and the time interval calculated by the calculation unit after the temperature change.

5. The scanning optical apparatus according to claim 1, wherein the scan adjusting unit adjust the scanning time for scanning the light beam on the surface to be scanned, based on the time interval calculated by the calculation unit.

6. The scanning optical apparatus according to claim 5, wherein the scan adjusting unit adjusts the scanning time for scanning the light beam on the surface to be scanned, based on a ratio of the time interval calculated by the calculation unit before the temperature change and the time interval calculated by the calculation unit after the temperature change.

7. The scanning optical apparatus according to claim 5, wherein the scan adjusting unit adjusts the scanning time for scanning the light beam on the surface to be scanned, based on a difference between the time interval calculated by the calculation unit before the temperature change and the time interval calculated by the calculation unit after the temperature change.

8. An image forming apparatus comprising;
the scanning optical apparatus claimed in claim 1;
an image carrier for carrying a toner image transferred to an object to be transferred;
a charging device for charging an image carrier surface of the image carrier; and
a developing device for sticking toner on a latent image formed by developing the image carrier surface by the scanning optical apparatus, and forming a toner image corresponding to the latent image on the image carrier surface.

* * * * *